United States Patent
Jung et al.

(10) Patent No.: US 9,306,721 B2
(45) Date of Patent: Apr. 5, 2016

(54) METHOD AND APPARATUS FOR DEVICE-TO-DEVICE COMMUNICATION

(71) Applicant: MOTOROLA MOBILITY LLC, Libertyville, IL (US)

(72) Inventors: Hyejung Jung, Palatine, IL (US); Vijay Nangia, Algonquin, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 165 days.

(21) Appl. No.: 13/856,069

(22) Filed: Apr. 3, 2013

(65) Prior Publication Data
US 2014/0269338 A1 Sep. 18, 2014

Related U.S. Application Data

(60) Provisional application No. 61/788,129, filed on Mar. 15, 2013.

(51) Int. Cl.
| | |
|---|---|
| *H04J 3/14* | (2006.01) |
| *H04L 12/26* | (2006.01) |
| *H04L 5/00* | (2006.01) |
| *H04W 76/02* | (2009.01) |
| *H04W 72/04* | (2009.01) |
| *H04L 1/18* | (2006.01) |

(52) U.S. Cl.
CPC ............ *H04L 5/0055* (2013.01); *H04W 72/04* (2013.01); *H04W 76/023* (2013.01); *H04L 1/18* (2013.01); *H04L 1/1861* (2013.01)

(58) Field of Classification Search
None
See application file for complete search history.

(56) References Cited

U.S. PATENT DOCUMENTS

| | | | |
|---|---|---|---|
| 2011/0235602 A1* | 9/2011 | Ji et al. | 370/329 |
| 2011/0255450 A1* | 10/2011 | Wang et al. | 370/280 |
| 2013/0142268 A1* | 6/2013 | Gao et al. | 375/252 |

(Continued)

FOREIGN PATENT DOCUMENTS

| | | |
|---|---|---|
| WO | 2012122419 A2 | 10/2010 |
| WO | 2011073737 A1 | 6/2011 |
| WO | 2012019348 A1 | 2/2012 |
| WO | 2012048464 A1 | 4/2012 |
| WO | 2012052911 A1 | 4/2012 |
| WO | 2012124923 A2 | 9/2012 |

OTHER PUBLICATIONS

Alcatel-Lucent Shanghai Bell et al: "Discussion on HARQ timing with dynamic TDD UL-DL configuration", 3GPP Draft; R1-120513 Discussion on HARQ Timing with Dynamic TDD UL-DL Configuration Final, 3rd Generation Partnership Project (3GPP), Mobile Competence Centre, vol. RAN WG1, no. Dresden, Germany, Feb. 6, 2012-Feb. 10, 2012, Feb. 1, 2012, XP050563230, [retrieved on Feb. 1, 2012].

(Continued)

*Primary Examiner* — Edan Orgad
*Assistant Examiner* — Rebecca Song
(74) *Attorney, Agent, or Firm* — Lerner, David, Littenberg, Krumholz & Mentlik, LLP

(57) ABSTRACT

A first UE receives a first uplink-downlink configuration from a network entity via broadcast signalling. The first uplink configuration designates a first set of subframes of a series of subframes as uplink subframes. The first UE also receives a second uplink-downlink configuration via dedicated signalling. The second uplink-downlink configuration designates a second set of subframes of the series of subframes as uplink subframes. The first set of uplink subframes and the second set of uplink subframes differ from one another by at least one uplink subframe.

23 Claims, 16 Drawing Sheets

(56) References Cited

U.S. PATENT DOCUMENTS

2013/0223318 A1* 8/2013 Liu et al. .................. 370/312
2013/0272169 A1* 10/2013 Wang et al. ............... 370/280
2013/0343239 A1* 12/2013 Damnjanovic et al. ..... 370/280
2014/0003301 A1* 1/2014 Madan et al. .............. 370/280

OTHER PUBLICATIONS

Catt: "Multiplexing between cellular link and D2D link", 3GPP Draft; R1-135093, 3rd Generation Partnership Project (3GPP), Mobile Competence Centre, vol. RAN WG1, no. San Francisco, USA, Nov. 13, 2013, XP050734796, <http://www.3gpp.org/ftp/Meetings_3GPP_Sync/RAN/RAN1/Docs>, [Retrieved on Nov. 13, 2013].

International Search Report for Application No. PCT/US2014/017265 dated May 27, 2014.

LG Electronics: "Issues in Further Enhancements to LTE TDD", 3GPP Draft; R1-121461 ETDD Issues. 3rd Generation Partnership Project (3GPP), Mobile Competence Centre, vol. Ran WG1, no, Jeju, Korea; 20120326-20120330, Mar. 20, 2012, XP050599742, [Retrieved on May 20, 2012].

\* cited by examiner

| CONFIGURATION 0 | UL | | | #2 | #3 | #4 | | | | #7 | #8 | #9 |
|---|---|---|---|---|---|---|---|---|---|---|---|---|
| DL:UL 2:3 | DL | #0 | | | | | #5 | | | | | |
| CONFIGURATION 1 | UL | | | #2 | #3 | #4 | | | | #7 | #8 | #9 |
| DL:UL 3:2 | DL | #0 | | | | | #5 | | | | | |
| CONFIGURATION 2 | UL | | | #2 | #3 | #4 | | | | #7 | #8 | |
| DL:UL 4:1 | DL | #0 | | | | | #5 | | | | | #9 |
| CONFIGURATION 3 | UL | | | #2 | #3 | #4 | | | | #7 | | |
| DL:UL 7:3 | DL | #0 | | | | | #5 | #6 | | | #8 | #9 |
| CONFIGURATION 4 | UL | | | #2 | #3 | | | | | #7 | | |
| DL:UL 8:2 | DL | #0 | | | | #4 | #5 | #6 | | | #8 | #9 |
| CONFIGURATION 5 | UL | | | #2 | | | | | | | | |
| DL:UL 9:1 | DL | #0 | | | #3 | #4 | #5 | #6 | #7 | | #8 | #9 |
| CONFIGURATION 6 | UL | | | #2 | #3 | #4 | | | | #7 | #8 | |
| DL:UL 5:5 | DL | #0 | | | | | #5 | #6 | | | | #9 |

DwPTS — GP — UpPTS

*FIG. 8A*

METHOD AND APPARATUS FOR DEVICE-TO-DEVICE COMMUNICATION

TECHNICAL FIELD

The disclosure relates to device-to-device communication in a wireless network.

BACKGROUND

The demand for data capacity in wireless networks has increased dramatically with the widespread use of smartphones and tablet computers. In addition to traditional voice services, consumers now expect to be able to use their wireless devices to watch streaming video, often in a high-definition format, play on-line games in real-time, and transfer large files. This has put additional load on wireless networks and, in spite of advances in cellular technology (e.g., the deployment of 4G networks, the use of newer versions of the IEEE 802.11 family of standards), capacity is still an issue that providers have to consider.

BRIEF DESCRIPTION OF THE DRAWINGS

FIGS. 8A and 8B show an UL/DL configuration according to an embodiment of the invention.

DESCRIPTION

Figure 1:
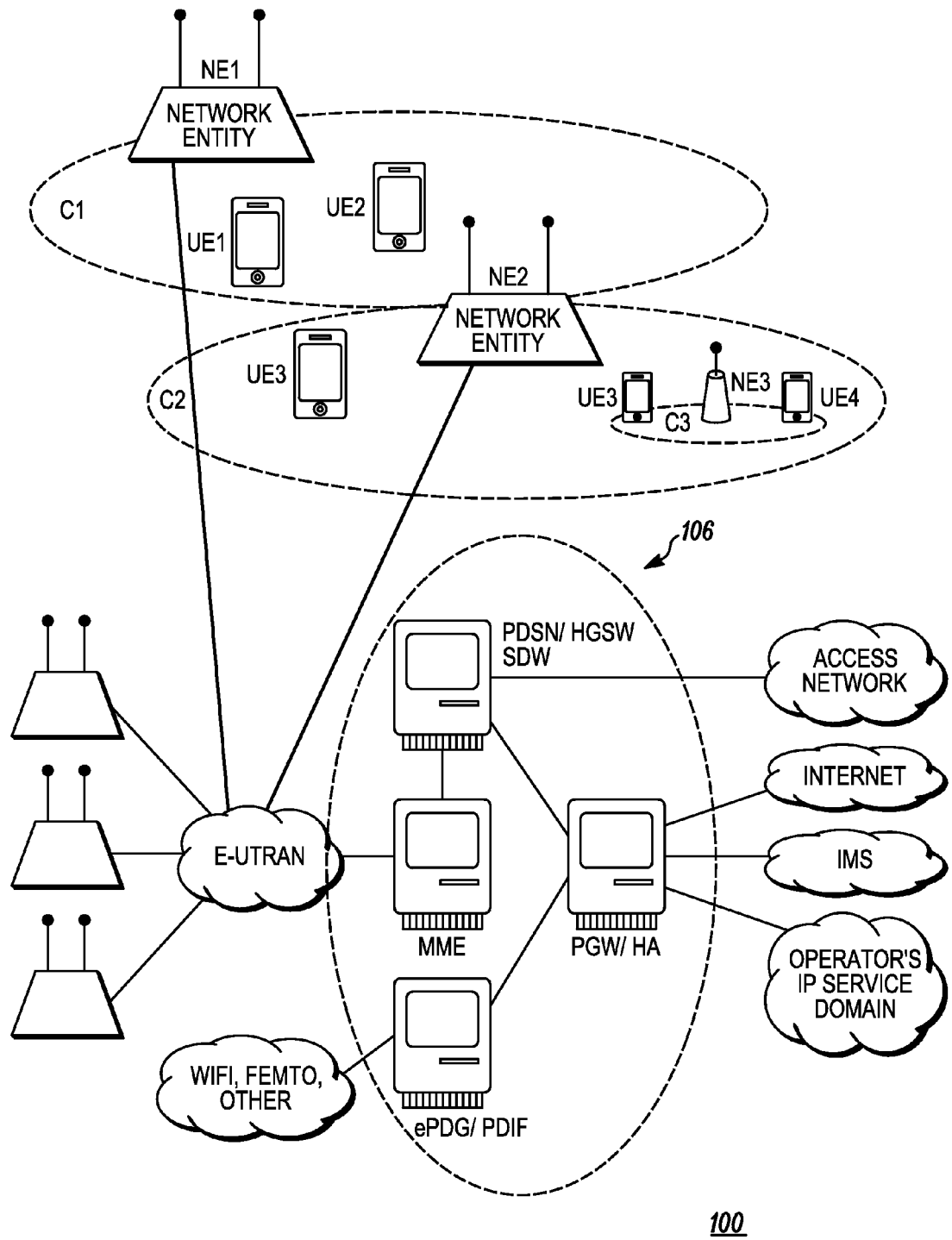
FIG. 1 is an example of a communication system in which various embodiments of the invention may be implemented.

Cellular networks such as LTE and UMTS have traditionally operated on a model in which the network controls radio communications. For example, assume that UE1 and UE2 operate in a traditional cellular network, and that the network includes eNB1 and eNB2, with UE1 being connected to eNB1, and UE2 being connected to eNB2. When UE1 transmits data that is intended for UE2, the data travels from UE1 to eNB1, which relays the data to eNB2. The eNB2 then relays the message to UE2. Thus, it takes at least two hops (UE1->eNB1) (eNB2->UE2) on the cellular network for data to get from UE1 to UE2. There may also be further delay resulting from additional hops being needed for routing. Such delays may occur even if the two UEs are connected to the same eNB.

However, if the UEs are able to communicate directly with one another using so-called Device-to Device (D2D) communication, it would take only one hop (UE1->UE2) for data to get from UE1 to UE2.

In an embodiment of the invention, UEs communicate directly with one another without passing through a network or other intermediate entity. To carry out such D2D communication, the UEs use resources (e.g., cellular spectrum) of the network. The UEs may, however, maintain their usual connections to the network (e.g., each UE may still be connected to an eNB of a cellular network).

Benefits of D2D communication in a cellular network include (1) increased cellular system throughput (e.g., D2D traffic uses fewer resources to communicate same amount of data), and (2) improved user experience (e.g., faster data transfer and reduced latency).

In accordance with the foregoing, a method and apparatus for device-to-device communication is provided. According to an embodiment of the invention, a first UE receives a first uplink-downlink configuration from a network entity via broadcast signaling. The first uplink-downlink configuration designates a first set of subframes of a series of subframes as uplink subframes. The first UE also receives a second uplink-downlink configuration via dedicated signaling. The second uplink-downlink configuration designates a second set of subframes of the series of subframes as uplink subframes. In such an embodiment, the first set of uplink subframes and the second set of uplink subframes differ from one another by at least one uplink subframe.

The first UE also determines which subframe or subframes of the series are device-to-device subframes and which subframe or subframes of the series are HARQ-ACK subframes. The first UE does so based on the first set of uplink subframes and the second set of uplink subframes. The first UE transmits directly to a second UE and receives directly from the second UE on one or more of the device-to-device subframes. Additionally, the first UE transmits one or more uplink HARQ-ACK messages to the network entity on one or more of the HARQ-ACK subframes.

In an embodiment of the invention, a first UE receives a first uplink-downlink configuration of a series of subframes from a network entity via broadcast signaling. The first uplink-downlink configuration designates a set of subframes of the series of subframes as uplink subframes. The first UE also receives, via dedicated signaling, an indication of which subframe or subframes of the series are to be used as device-to-device subframes. Based on the first uplink-downlink configuration and on the positions of the one or more device-to-device subframes, the first UE determines a second uplink-downlink configuration of the series of subframes. Based on the first and second uplink-downlink configurations, the first UE determines which subframe or subframes of the series are to be used as HARQ-ACK subframes.

Furthermore, the first UE transmits directly to the second UE and receives directly from the second UE on one or more of the device-to-device subframes; and transmits one or more uplink HARQ-ACK messages to the network entity on messages on one or more of the HARQ-ACK subframes.

Referring to FIG. 1, an example of a wireless communication network in which embodiments of the invention may be used will now be described. The network 100 is configured to use one or more Radio Access Technologies (RATs), examples of which include an E-UTRA, IEEE 802.11, and IEEE 802.16. The network 100 includes a first cell C1 and a second cell C2. Possible implementations of C1 and C2 include a cellular network macrocell, a femtocell, a picocell, and a wireless access point. First cell C1 is managed by a first network entity NE1 and second cell C2 is managed by a second network NE2. Possible implementations of a network entity include an E-UTRA base station, an eNB, a transmission point, a Remote Radio Head, an HeNB, an 802.11 AP, and an IEEE 802.16 base station.

Also shown in FIG. 1 are User Equipments (UE) UE1, UE2, and UE3. Possible implementations of a UE include a mobile phone, a tablet computer, a laptop, and an M2M (Machine-to-Machine) device. Each of NE1 and NE2 transmits signals to and receives signals from one or more of the UEs.

Communication between a network entity and a UE typically occurs when the UE is located within the network entity's coverage area. For example, NE1 would typically communicate with UE1 and UE2, and NE2 would typically communicate with UE3. In certain circumstances, each network entity may transmit signals to and receive signals from UEs that are connected to other network entities. For example, NE1 may be able to communicate with UE3 if UE3 is close to NE1's coverage area.

The cells, network entities, and UEs of FIG. 1 are only representative, and are intended to facilitate description. In fact, the network 100 may have many cells and network entities and be in communication with many UEs.

In some embodiments of the invention, C1 or C2 are controlled by a single network entity, or by multiple network entities that coordinate with one another, e.g., when Carrier Aggregation (CA) or Coordinated Multipoint communication (CoMP) is being used. Furthermore, one or more of C1 and C2 may be a virtual cell. A virtual cell is a cell that is created as a result of multiple network entities cooperating. A UE generally does not perceive any distinction between a virtual cell and a non-virtual cell.

In an embodiment of the invention, each UE (FIG. 1) is a wireless communication device capable of sending and receiving data via the network entities NE1 and NE2 to and from other elements of the network 100. Each UE is also capable of communicating with the other UEs over the network 100 via one or more of the network entities NE1 and NE2. Additionally, one or both of the UEs is capable of engaging in D2D communication.

In various embodiments, each UE of FIG. 1 is capable of transmitting user data and control information to one or more of the network entities on an UL carrier, and receiving data and control signals from one or more of the network entities on a DL carrier. As used herein, "control information" includes data that UEs and various elements of the network 100 use for facilitating information, but that is not intended to be accessed by a user or by user applications. "User data" as herein refers to data that is intended to be accessed by a user and user applications.

Referring still to FIG. 1, the network 100 also includes a backhaul system (not shown). The backhaul system includes wired and wireless infrastructure elements, such a fiber optic lines, that carry signals around various parts of the network 100, including among the network entities. The network 100 also includes a core 106 that controls the operation of the network 100 using various resources, including billing systems, home location registers, and internet gateways. Several core resources are depicted in FIG. 1. In an LTE implementation, resources of the core 106 communicate with network entities over E-UTRA and with other networks. Examples of core resources are depicted in FIG. 1.

Figure 2:
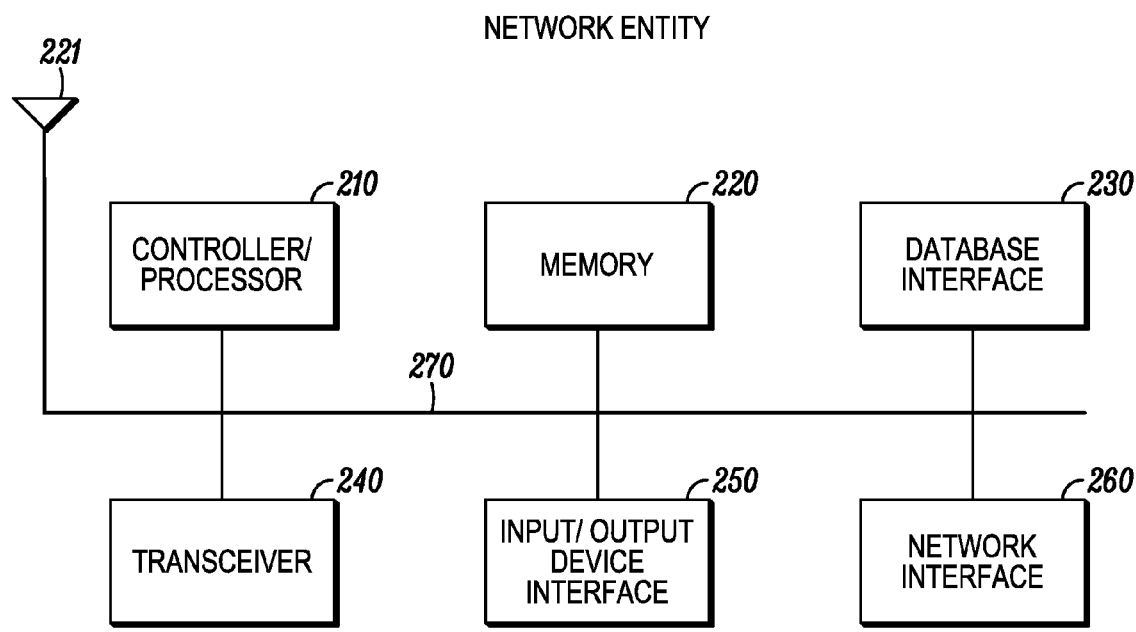
FIG. 2 is a block diagram depicting certain aspects of a network entity in accordance with an embodiment of the invention.

FIG. 2 illustrates a configuration of a network entity (from FIG. 1) in accordance with an embodiment of the invention. The network entity includes a controller/processor 210, a memory 220, a database interface 230, a transceiver 240, input/output (I/O) device interface 250, a network interface 260, and one more antennas, represented by antenna 221. Each of these elements is communicatively linked to one another via one or more data pathways 270. Examples of data pathways include wires, including wires whose dimensions are measured in microns, and wireless connections.

During operation of the network entity, the transceiver 240 receives data from the controller/processor 210 and transmits RF signals representing the data via the antenna 221. Similarly, the transceiver 240 receives RF signals via the antenna 221 converts the signals into the appropriately formatted data, and provides the data to the controller/processor 210. The controller/processor 210 retrieves instructions from the memory 220 and, based on those instructions, provides outgoing data to, or receives incoming data from the transceiver 240. If needed, the controller/processor can retrieve, from a database via the database interface 230, data that facilitates its operation.

Referring still to FIG. 2, the controller/processor 210 can transmit data to other network entities of the network 100 (FIG. 1) via the network interface 260, which is coupled to the backhaul network. The controller/processor 210 can also receive data from and send data to an external device, such as an external drive, via the input/output interface 250.

The controller/processor 210 may be any programmable processor. The controller/processor 210 may be implemented, for example, as a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like.

The memory 220 may be implemented in a variety of ways, including as volatile and nonvolatile data storage, electrical, magnetic optical memories, random access memory (RAM), cache, hard drive, or other type of memory. Data is stored in the memory 220 or in a separate database. The database interface 230 is used by the controller/processor 210 to access the database. The database contains any formatting data to connect UE to the network 100 (FIG. 1). The transceiver 240 creates a data connection with the UE.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 100. The network connection interface 260 may be used to connect a client device to the network.

According to an embodiment of the invention, the antenna 221 is one of a set of geographically collocated or proximal physical antenna elements linked to the one or more data paths 270, each having one or more transmitters and one or more receivers. The number of transmitters that the network entity has is related, to the number of transmit antennas that the network entity has. The network entity may use the multiple antennas to support MIMO communication.

Figure 3:
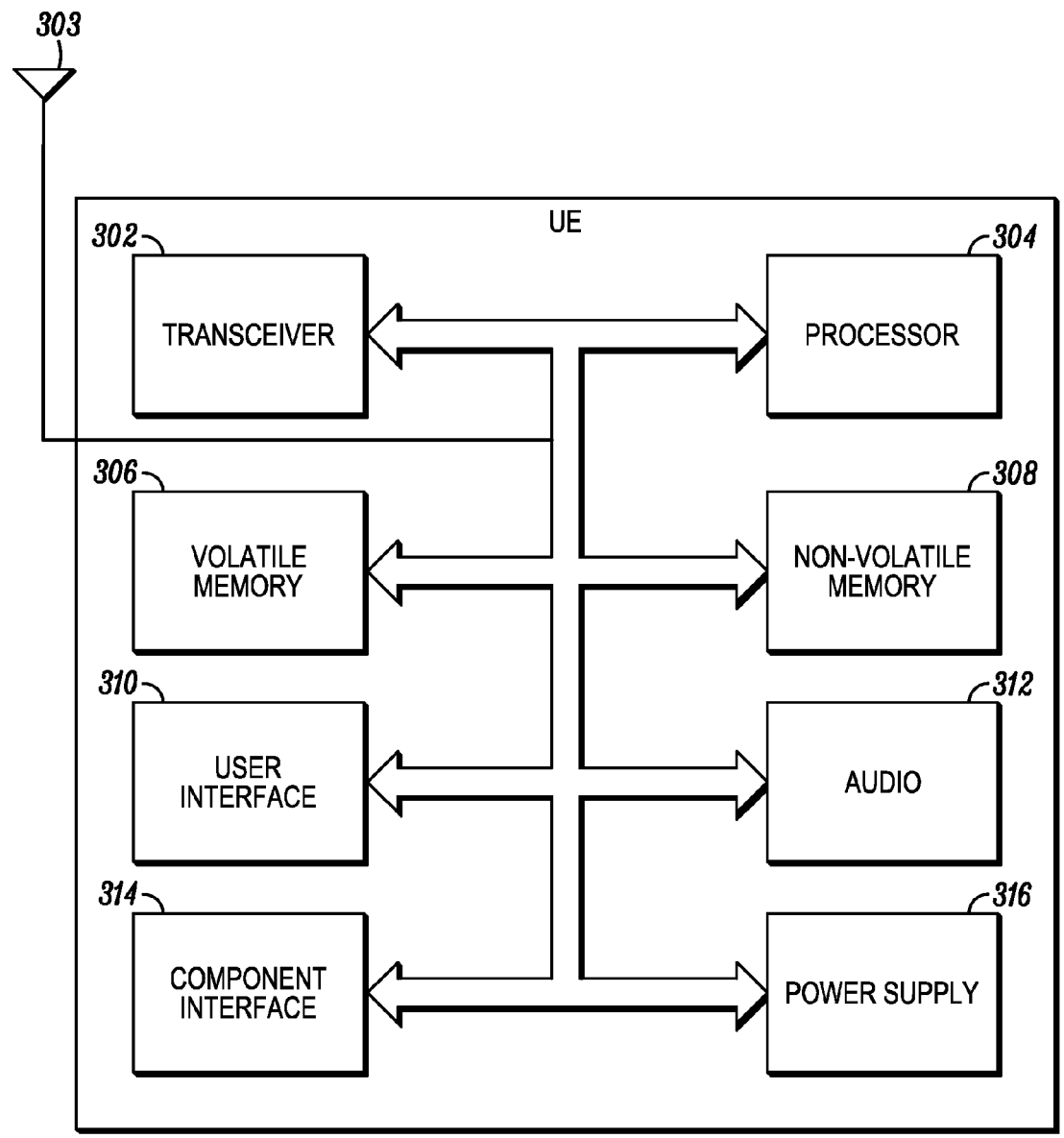
FIG. 3 is a block diagram depicting aspects of a UE in an embodiment of the invention.

FIG. 3 illustrates a block diagram of a UE (such as one or more of the UEs depicted in FIG. 1) according to an embodiment of the invention. The UE includes a transceiver 302, which is capable of sending and receiving data over the network 100. The transceiver is linked to one or more antennas 303 that may be configured like the one or more antennas of the network entity of FIG. 2. The UE may support MIMO.

The UE also includes a processor 304 that executes stored programs, as well as a volatile memory 306, and a non-volatile memory 308. The volatile memory 306 and the non-volatile memory 308 are used by the processor 304. The UE includes a user input interface 310 that may comprise elements such as a keypad, display, touch screen, and the like. The UE also includes a display screen and an audio interface 312 that may comprise elements such as a microphone, earphone, and speaker. The UE also includes a component interface 314 to which additional elements may be attached, for example, a universal serial bus (USB) interface. Finally, the UE includes a power supply 316.

During operation, the transceiver 302 receives data from the processor 304 and transmits RF signals representing the data via the antenna 303. Similarly, the transceiver 302 receives RF signals via the antenna 303, converts the signals into the appropriately formatted data, and provides the data to the processor 304. The processor 304 retrieves instructions from the non-volatile memory 308 and, based on those instructions, provides outgoing data to, or receives incoming data from the transceiver 302. If needed, the processor 304 can write to, or read from the volatile memory 306, particularly for caching data and instructions that the processor 304 requires in order for it to perform its functions.

The user interface 310 includes a display screen, such as a touch-sensitive display, that displays, to the user, the output of various application programs. The user interface 310 additionally includes on-screen buttons that the user can press in order to cause the UE to respond. The content shown on the user interface 310 is generally provided to the user interface at the direction of the processor 304. Similarly, information received through the user interface 310 is provided to the processor, which may then cause the UE to react.

In an LTE embodiment, the modulation scheme used for communication between the network entities and the UEs differs depending on whether the signals are being sent in the UL direction (travelling from a UE to a network entity) or in the DL direction (travelling from a network entity to a UE). The modulation scheme used in the DL direction is a multiple-access version of OFDM called Orthogonal Frequency-Division Multiple Access (OFDMA). In the UL direction, Single Carrier Frequency Division Multiple Access (SC-FDMA) or DFT-SOFDM is typically used. In an LTE implementation, the bandwidth of the UL or DL carrier varies depending upon whether carrier aggregation is being used (e.g., up to 20 MHz without CA, or up to 100 MHz with CA).

Figure 4A:
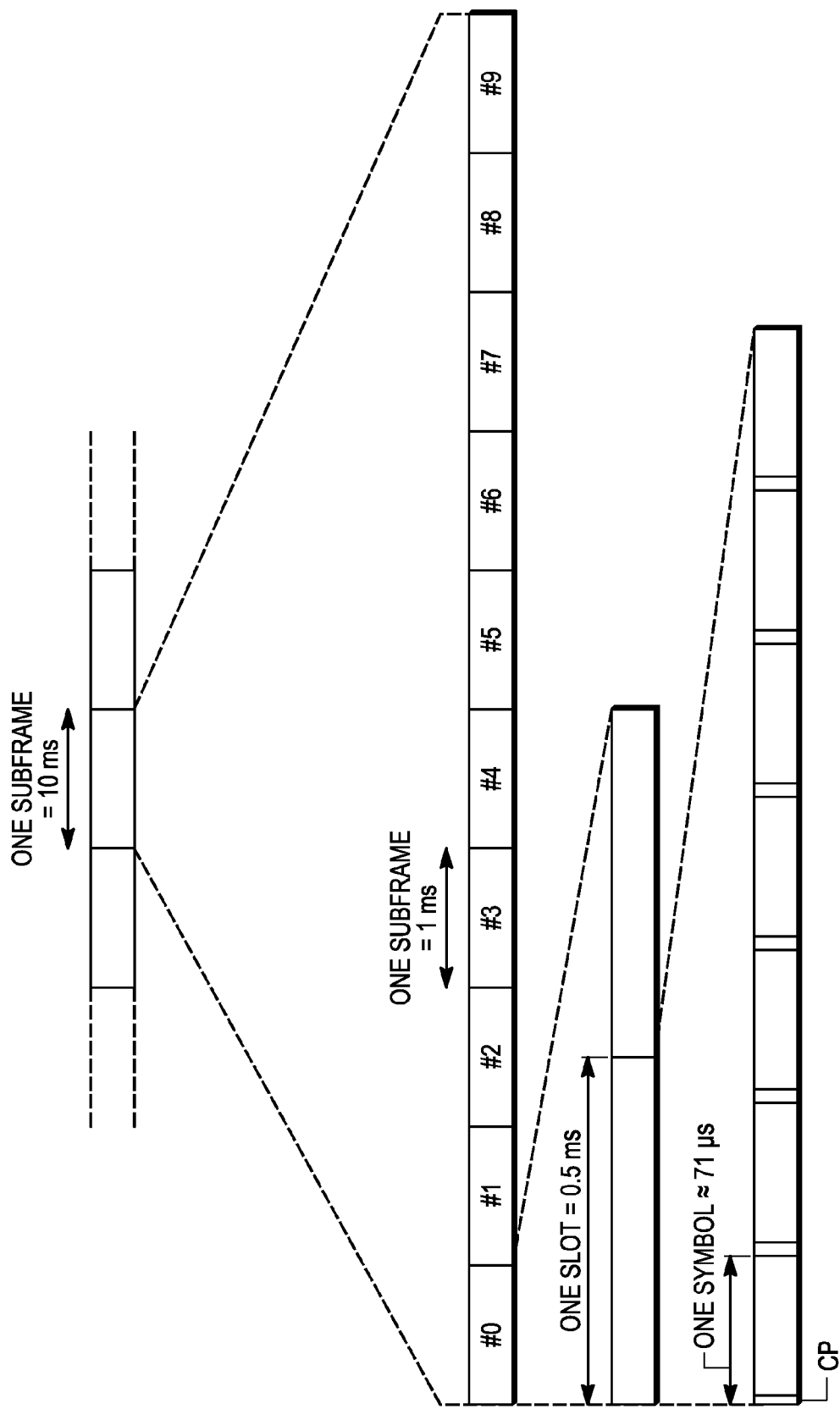
FIG. 4A is a frame structure according to an embodiment of the invention.
Figure 4B:
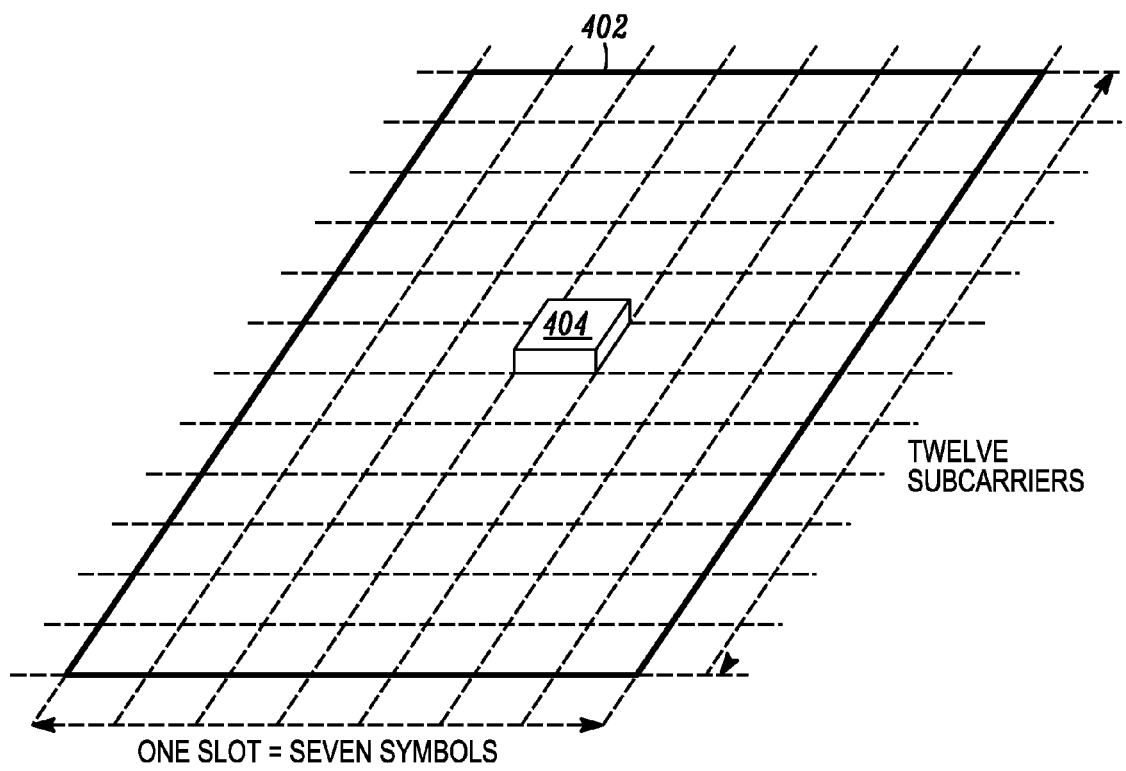
FIG. 4B is a resource block according to an embodiment of the invention.

Referring to FIG. 4A, an LTE frame structure used for carrying data between the UEs and the network entities on both UL carriers and DL carriers according to an embodiment of the invention will now be described. In LTE operation, both uplink and downlink radio frames are each 10 milliseconds (10 ms) long, and are divided into ten subframes, each of 1 ms duration. Each subframe is divided into two slots of 0.5 ms each. Each slot contains a number of OFDM symbols, and each OFDM symbol may have a Cyclic Prefix (CP). The duration of a CP varies according to the format chosen, but is about 4.7 microseconds in the example of FIG. 4A, with the entire symbol being about 71 microseconds. In the context of time-frequency, the subframe is divided into units of RBs, as shown in FIG. 4B. When a normal CP is used, each RB 402 is 12 subcarriers by 7 symbols (one slot). Each RB (when a normal CP is used), in turn, is composed of 84 REs 404, each of which is 1 subcarrier by 1 symbol. However, RBs and REs may be other sizes in other embodiments. Thus, the terms RE and RB may includes time-frequency resources of any size. In LTE, an RB or an RB pair is the typical unit to which resource allocations may be assigned for uplink and downlink communications.

Figure 5:
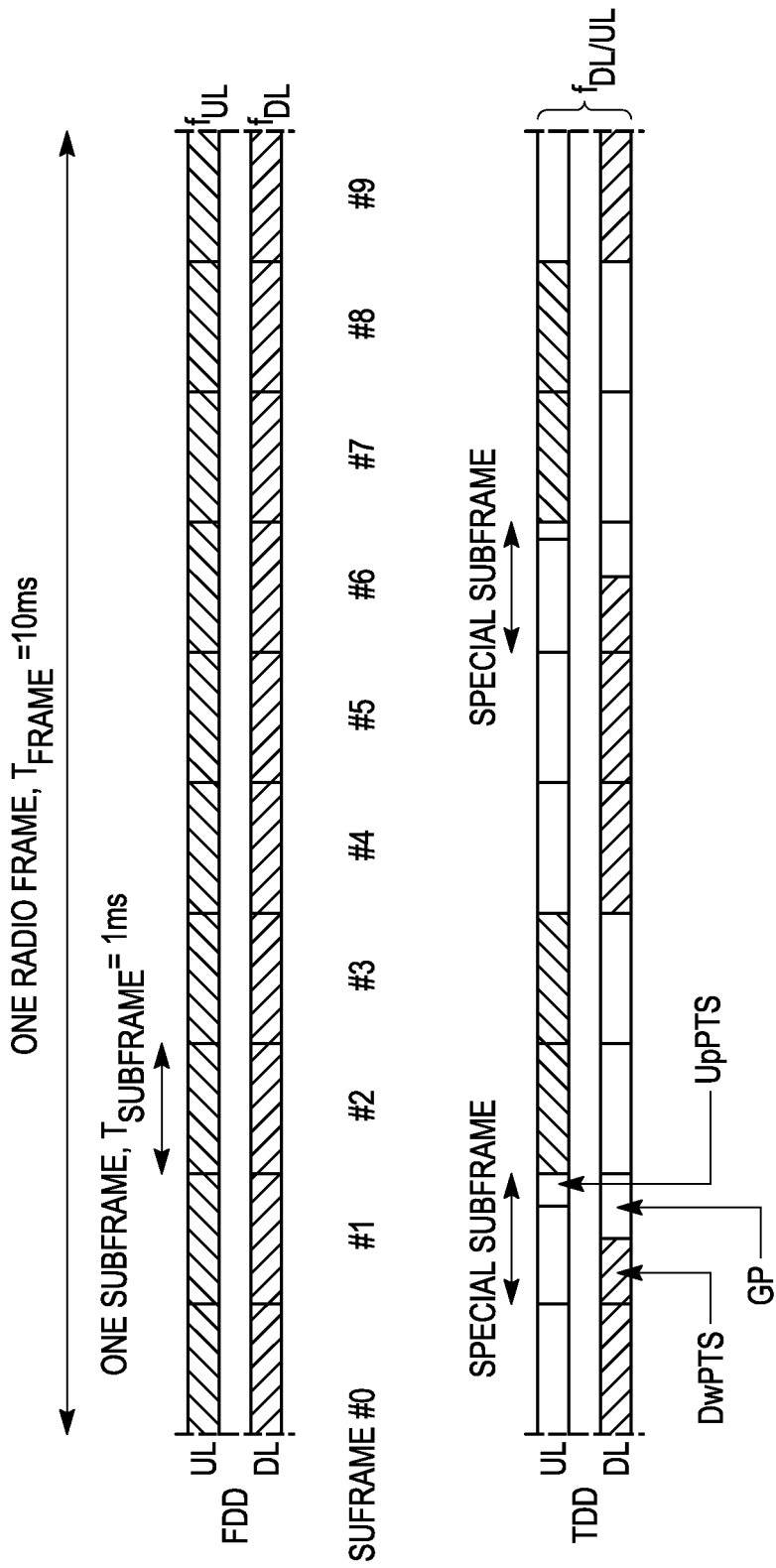
FIG. 5 is a frame structure according to an embodiment of the invention.

Referring again to FIG. 5, the general mode of communication of the network 100 according to an embodiment of the invention will now be described. The network entities and the UEs generally communicate with one another via physical UL channels of the UL carrier and via physical DL channels of the DL carrier. Two possible modes of operation for the communication system are FDD and TDD.

When operating in an FDD mode, the frequency range of the UL carrier does not overlap with that of the DL carrier. When using FDD, a UE may operate in full-duplex mode, in which it can transmit on the UL carrier simultaneously with receiving on the downlink carrier, or in half-duplex mode, in which it only transmits or only receives at any given time. Some UEs are capable of operating only in half-duplex mode while others are capable of operating in both modes. Some UEs can operate in full-duplex mode in certain bands, but only in half duplex mode in other bands.

When operating in TDD mode, the UL carrier and DL carrier use the same frequency range. A UE operating in TDD mode does not transmit and receive at the same time. Rather, it alternates between transmitting and receiving by transmitting on one set of subframes and receiving on another set of subframes. On some subframes, referred to as special subframes, it transmits on part of the subframe and receives on a different part of the subframe.

A special subframe is split into three parts: a downlink part (DwPTS), a guard period (GP), and an uplink part (UpPTS). The DwPTS is generally functions as a normal DL subframe, although it does not carry as much data as a normal DL subframe. The UpPTS, however, is not used for data transmission, but rather is used for channel sounding or random access. It can also be left empty to act as an extra guard period.

Figure 6:
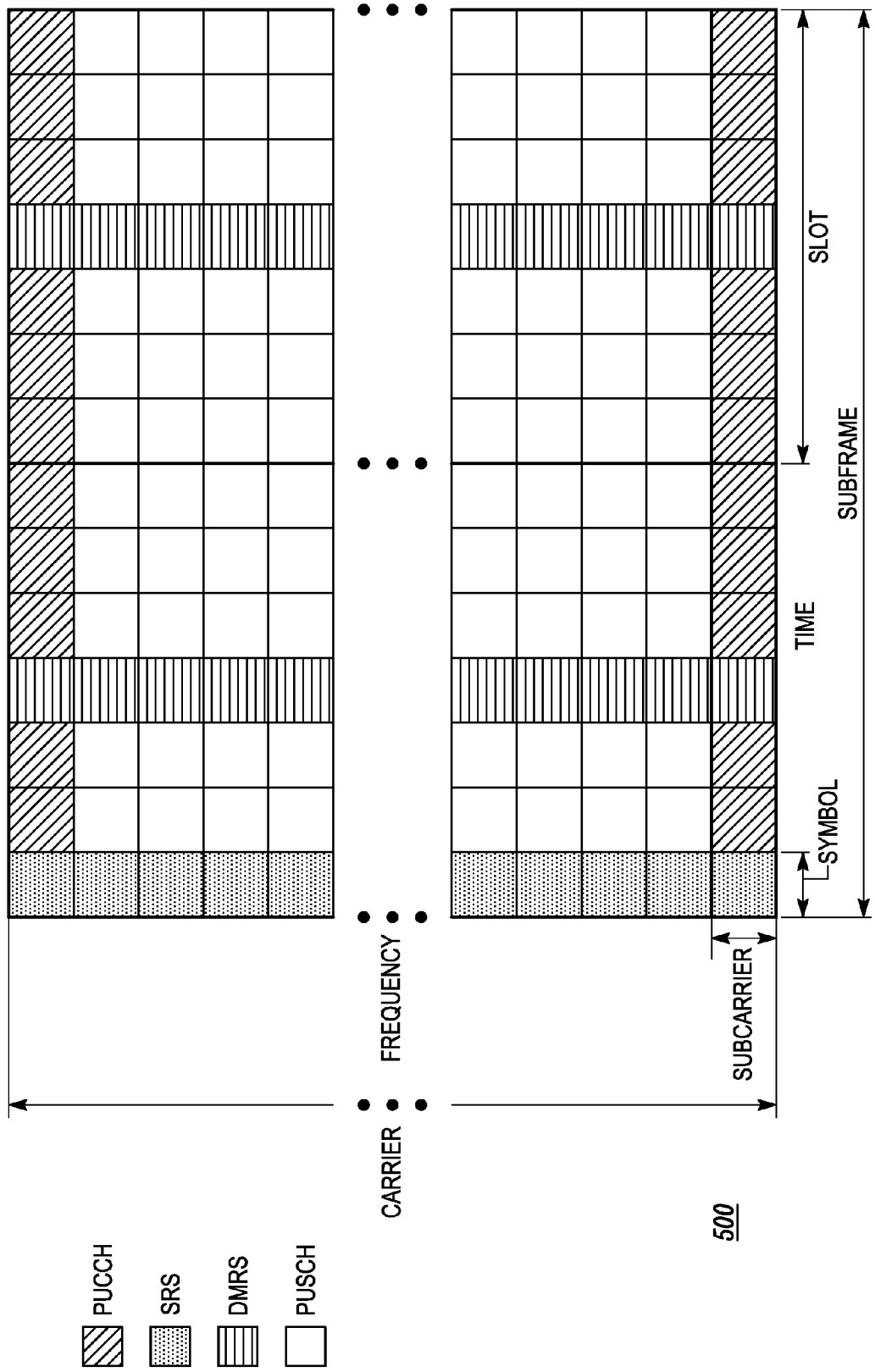
FIG. 6 is an uplink subframe according to an embodiment of the invention.

Referring to FIG. 6, a UL subframe structure used to carry data from UEs to the network entities over an UL carrier according to an LTE embodiment of the invention will now be described. The horizontal scale of FIG. 6 represents frequency, while the vertical scale represents time. In LTE, a UE typically transmits data to a network entity on a Physical Uplink Shared Channel (PUSCH), and typically transmits control information to a network entity on a physical uplink control channel (PUCCH). The PUSCH generally carries user data such as video data (e.g., streaming video) or audio data (e.g., voice calls) from the UEs to the network entities. A UE may also transmit control information on the PUSCH, such as HARQ feedback, CSI reports. Additionally, a UE can transmit a scheduling request (SR) on the PUCCH. A UE may also transmit a sounding reference signal (SRS), which is not part of any particular channel.

Figure 7:
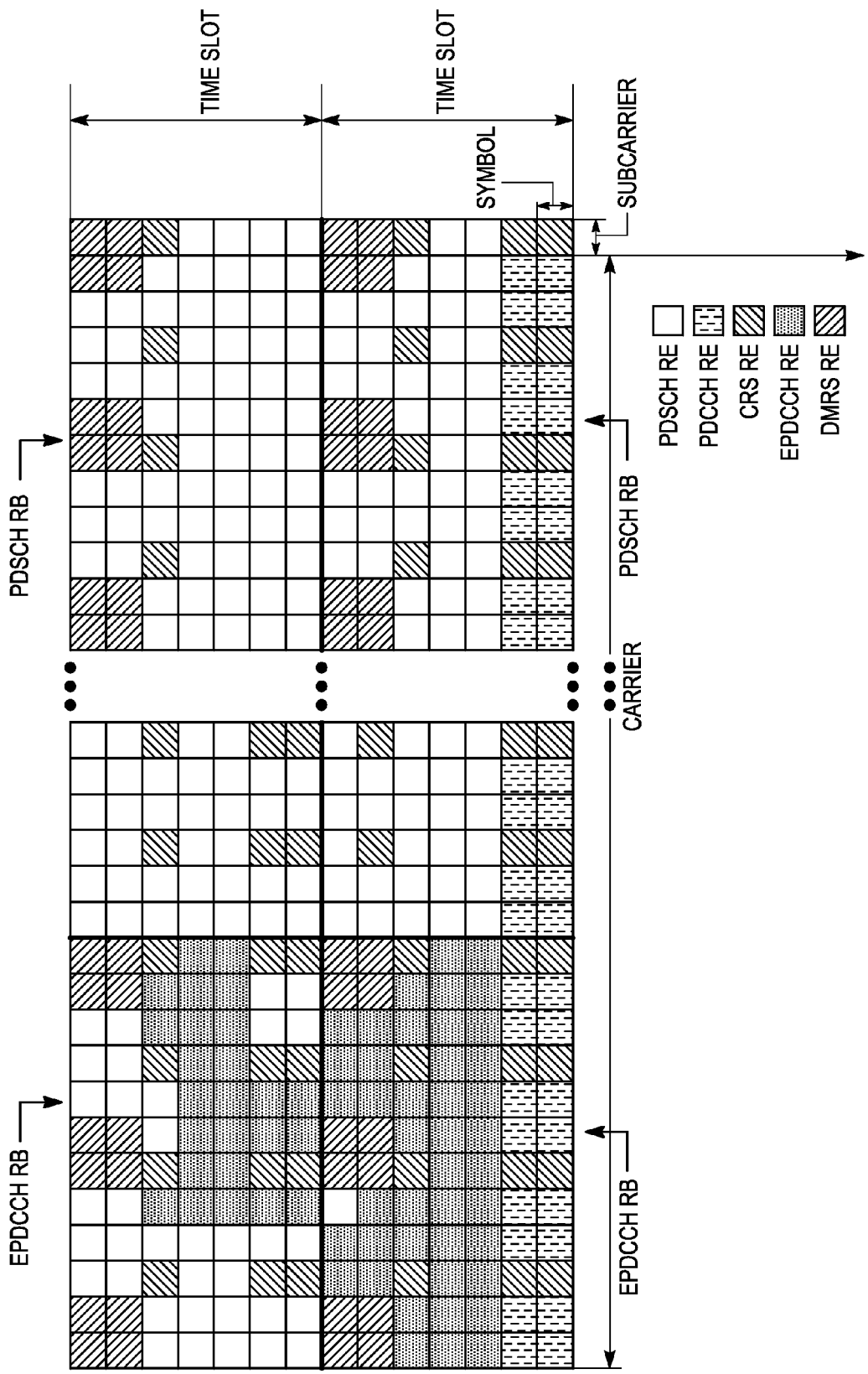
FIG. 7 is a downlink subframe according to an embodiment of the invention.

To request uplink resources from a network entity in an embodiment of the invention, a UE transmits a scheduling request to a network entity. Referring to FIG. 7, if the network entity grants the request, it responds by sending a scheduling grant to the UE. A scheduling grant is part of the downlink control information (DCI). The network entity transmits the DCI on a downlink control channel (e.g., a physical downlink control channel (PDCCH)). The scheduling grant provides the UE with parameters that the UE uses to transmit data on the PUSCH. These parameters include a data modulation and coding scheme, the transport block size, a resource allocation (e.g., resource blocks and position within the transmission bandwidth configuration), hopping parameters, power control information, and other control information.

In an embodiment of the invention, there are different PUCCH formats, but regardless of format a PUCCH generally carries control information from the UEs to the network entities. PUCCH resource blocks are typically located at the edges of the UL carrier, while the RBs in between may be used for PUSCH resource assignment. In various embodiments of the invention described herein, a network entity can configure a PUCCH to carry data from UE to UE in D2D communication. The portion of the PUCCH used for D2D will be referred to as PUCCH-D2D.

The control information transmitted by a UE on the PUCCH includes HARQ feedback, SR, and CSI reports. The UE sends HARQ feedback in order to ACK or NACK data that the UE receives from a network entity. An SR is used by the UE to request UL resources from the network 100, including from one or more network entities. CSI reports are used by a UE to report, to a network entity, information regarding the DL transmission channel as seen from the point of view of the UE.

Each CSI report sent by a UE may include one or more of a CQI, a PMI, PTI, and an RI. The UE uses the CQI to indicate the highest MCS that, if used, would result in DL transmissions having a BLER of no more than 10%. The UE uses the PMI to indicate, to the network entity, which precoder matrix should be used for DL transmissions. The RI is used by the UE to recommend the transmission rank (number of transmission layers) that should preferably be used for DL transmission to the UE. The PTI distinguishes slow fading environments from fast fading environments.

According to an embodiment of the invention, the UE transmits control information on RB pairs configured for PUCCH-D2D. The PUCCH-D2D RBs do not have to be contiguous. Each RB of a pair may, for example, be located on opposite ends of the frequency range of the transmission bandwidth.

A UE may transmit an UL DM-RS and/or SRS during communication with the network. The UL DM-RS is used by a network entity for channel estimation to enable coherent demodulation of the PUSCH and/or PUCCH. The SRS is used by the network entity for channel state estimation to support uplink channel-dependent scheduling and link adaptation.

Referring to FIG. 7, a time-frequency diagram of a DL subframe used for carrying data from one or more network entities to a UE on a DL carrier will now be described. The horizontal scale of FIG. 6 represents frequency, while the vertical scale represents time. The horizontal scale is divided into multiple blocks of frequency, or OFDM subcarriers ("subcarriers") that may be allocated for transmission. The vertical scale of FIG. 6 is divided into multiple blocks of time, or OFDM symbols ("symbols") that may be allocated for transmission. The subframe is divided into time-frequency resource blocks (RBs). Each RB is twelve subcarriers by seven symbols typically for normal CP. The subframe is a total of 1 ms long and is divided into two time slots of 0.5 ms each. In turn, each RB can be divided into multiple resource elements (REs). Each RE is one subcarrier by one symbol.

The DL subframe includes several types of reference signals. The references signals are transmitted by the network entity to the UE to enable the UE to perform various functions. One such reference signal is Channel State Information Reference Signal (CSI-RS), which is used by the UE to determine channel-state information (CSI). The UE reports CSI to the network entity. The CSI-RS is not necessarily transmitted in all subframes.

Referring again to FIG. 6, other reference signals on the UL subframe include a Demodulation Reference Signal (DM-RS) with the REs being referred to as DM-RS REs. Typically, reference signals corresponding to antenna ports 7 and 8 are multiplexed using Code Division Multiplexing (CDM) or other scheme and are mapped to the same REs in time and frequency domain. The subframe can also include other reference signals such as cell-specific reference signal (CRS), positioning reference signal (PRS), primary synchronization signal (PSS) and secondary synchronization signal (SSS) that are distributed in the control regions and/or user data regions of the sub-frame.

The network entity provides the CSI-RS configuration to the UE via RRC signaling. The RRC layer in the UE provides the CSI-RS configuration information to the physical layer in the UE (e.g., "higher layer signaling").

HARQ

In various embodiments of the invention, the UEs and network entities of FIG. 1 use a HARQ communication scheme. More particularly, when a sender (UE or network entity) transmits a transport block to a receiver (UE or network entity), the receiving responds by sending a HARQ-ACK message ("HARQ-ACK") to the sender to indicate an ACK (transport block successfully decoded by receiver), a NACK (transport block not successfully decoded by receiver), or DTX (discontinued transmission).

When using HARQ, the sender transmits a packet, and waits until it receives an ACK or NACK from the receiver, and then transmits the next packet. Upon receiving an ACK or NACK, the sender transmits the next packet. In the case of receiving a NACK, the sender also retransmits the TB for which the NACK was received. The process of receiving/transmitting a TB/HARQ-ACK and responding appropriately may take a UE or network entity several subframes. To avoid wasting bandwidth during this delay, a UE or network entity establishes multiple HARQ processes, with each HARQ process offset in time from the other HARQ processes.

Figure 8B:
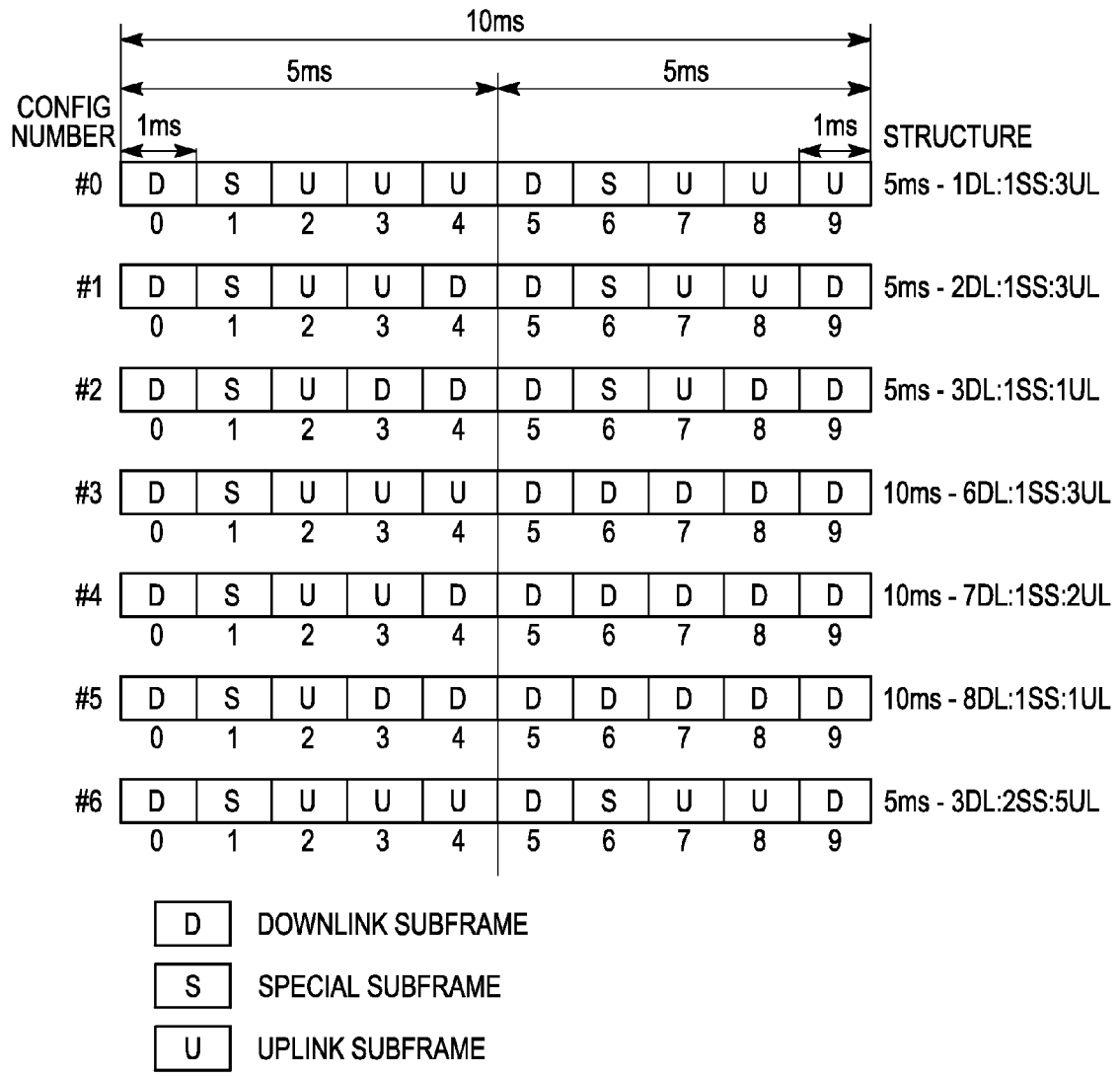

An uplink HARQ-ACK is transmitted in an uplink subframe, and a downlink HARQ-ACK is transmitted in a downlink subframe. In TDD operation, the time lag between the reception of a TB in a particular HARQ process and the transmission of the HARQ-ACK depends on the UL/DL configuration, which specifies the ratio of UL subframes to DL subframes, and the positions of the UL subframes and DL subframes within a frame. An example set of UL/DL configurations #0 to #6 is shown in FIG. 8A, where U=uplink frame, D=downlink frame, and S=special frame. Each UL/DL configuration has a corresponding HARQ-ACK scheme. An alternative presentation of configurations #0 to #6 is shown in FIG. 8B.

In an embodiment of the invention, the HARQ-ACK of a transport block in subframe n is transmitted in subframe n+k, where k≥4, and is selected such that (1) n+k is an UL subframe when the HARQ-ACK is to be transmitted from the UE (on PUCCH or PUSCH), and (2) n+k is a DL subframe when the acknowledgement is transmitted from the network entity.

The value of k depends on the UL/DL configuration. Table 1 shows values for k from the UEs perspective when the UE transmits HARQ-ACK messages in response to DL transmissions (PDSCH transmissions in this example). For example, when the UE and network entity communicate with one another using UL/DL configuration #2, a downlink transmission on PDSCH in DL subframe 0 should be acknowledged on PUCCH (or PUSCH) in UL subframe 0+7=7.

TABLE 1 values of k when the UE transmits a HARQ-ACK for DL subframe n in UL subframe n + k

| Configuration | | PDSCH reception subframe n | | | | | | | | | |
|---|---|---|---|---|---|---|---|---|---|---|---|
| (DL:UL) | Proc. | 0 | 1 | 2 | 3 | 4 | 5 | 6 | 7 | 8 | 9 |
| 0 (2:3) | 4 | 4 | 6 | — | — | — | 4 | 6 | — | — | — |
| 1 (3:2) | 7 | 7 | 6 | — | — | 4 | 7 | 6 | — | — | 4 |
| 2 (4:1) | 10 | 7 | 6 | — | 4 | 8 | 7 | 6 | — | 4 | 8 |
| 3 (7:3) | 9 | 4 | 11 | — | — | — | 7 | 6 | 6 | 5 | 5 |
| 4 (8:2) | 12 | 12 | 11 | — | — | 8 | 7 | 7 | 6 | 5 | 4 |
| 5 (9:1) | 15 | 12 | 11 | — | 9 | 8 | 7 | 6 | 5 | 4 | 13 |
| 6 (5:5) | 6 | 7 | 7 | — | — | — | 7 | 7 | — | — | 5 |

Table 1 also shows the number of HARQ processes used by the UE for each UL/DL configuration The UL/DL configurations #0 to #6 shown and described in FIGS. 8A, 8B, and Table 1, may also be expressed as shown in Table 2, which shows values for k for the UL subframe n in which the UE should transmit HARQ-ACK messages in response to transmissions in a DL subframe that was received k subframes prior.

TABLE 2 values of k when the UE transmits a HARQ-ACK for DL subframe n-k in UL subframe n

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 9A:
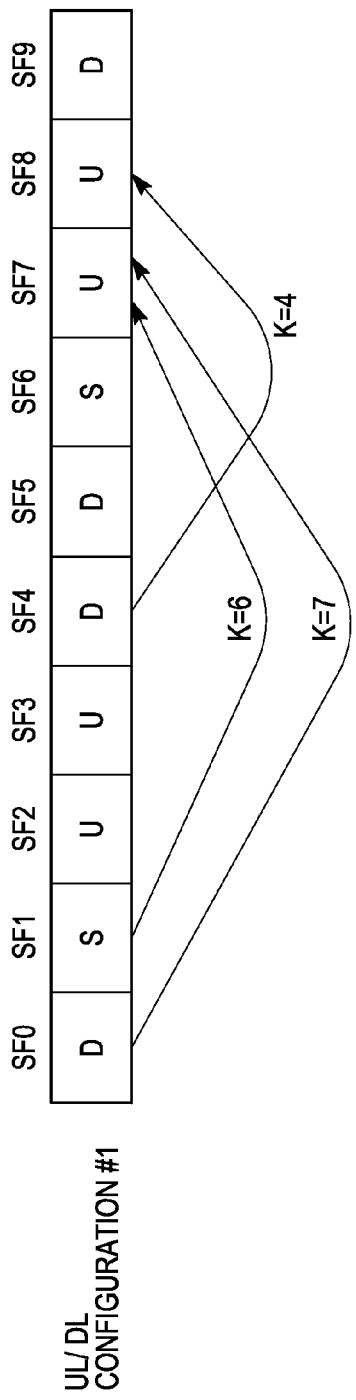
FIGS. 9A and 9B show HARQ-ACK feedback schemes according to an embodiment of the invention.

For example, in configuration #1, the HARQ-ACK message sent during UL subframe 7 should be responsive to DL transmissions that were received 7 and 6 subframes ago—i.e., DL subframes 0 and special subframe 1. The HARQ-ACK message sent during UL subframe 8 should be responsive to DL transmissions that were received 4 subframes ago—i.e., DL subframe 4. This example is also illustrated in FIG. 9A. As can be seen, multiple DL subframes can be responded to during a single UL subframe, such as when HARQ-ACK bundling or HARQ-ACK multiplexing is used.

HARQ-ACK Bundling and Multiplexing:

Because the number of DL and UL subframes in a frame is not equal in a TDD implementation (e.g., in TD-LTE), data transmission from multiple DL subframes may need to be acknowledged in a single UL subframe. In an embodiment of the invention, one of two methods may be employed to accomplish this—ACK bundling and ACK multiplexing, respectively. In ACK multiplexing, separate HARQ-ACK messages are sent in a single subframe. Thus, in the previous example (UL/DL configuration #1, FIG. 9A), a UE transmits two separate HARQ-ACKs during UL subframe 7 in response to DL subframes 0 and 1.

Figure 9B:
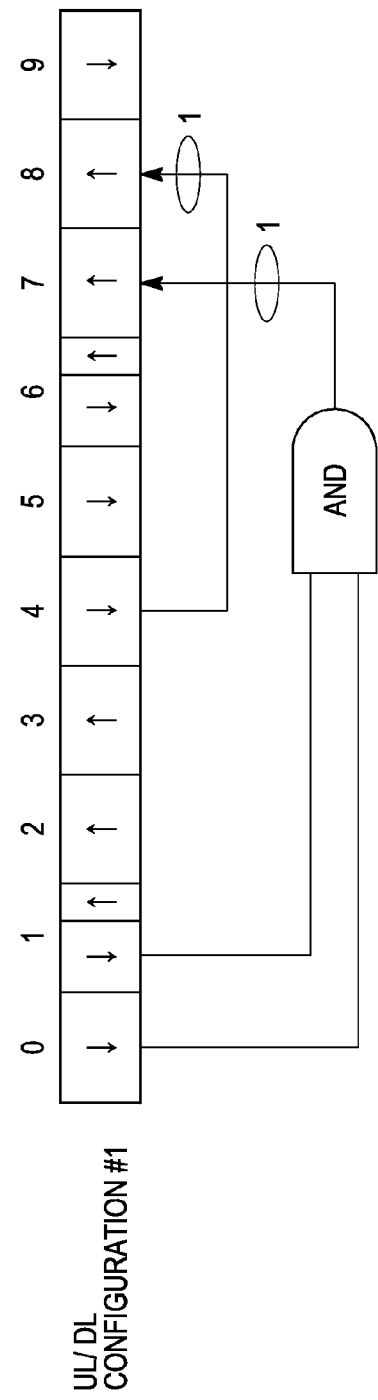

If a UE is limited in the amount of power that it is able to expend for HARQ, it may use ACK bundling. In one ACK bundling scheme, a UE performs a logical AND operation on multiple HARQ-ACK messages and transmits the result to the network entity. This process uses fewer bits than would a multiplexing process, thereby saving power. Referring to FIG. 9B, for example, in configuration #1, the UE is supposed to send a HARQ-ACK message to the network entity responsive to DL data receive during subframe 0 and subframe 1 during subframe 7. The UE performs a logical AND of these messages and transmits the result to the network entity during subframe 7. Thus, if there is an ACK in for subframe 0 and a NACK for subframe 1, the UE sends a NACK in subframe 7.

Carrier Aggregation

According to an embodiment of the invention, the UEs and NEs of FIG. 1 may communicate with one another using carrier aggregation (CA). CA allows multiple carriers (e.g., LTE carriers), each with a bandwidth up to 20 MHz, to be transmitted in parallel to, and received in parallel from a single UE. CA increases the size of the overall channel bandwidth that is usable by the UEs and NEs. Each carrier in a CA scheme is referred to as a component carrier. For example, UE4 and NE2 may communicate with one another using a component carrier of NE2 and a component carrier of NE3. In an LTE embodiment, up to five component carriers, each having up to a 20 MHz overall channel bandwidth, can be aggregated together, resulting in an effective overall channel bandwidth of up to 100 MHz.

Figure 10A:
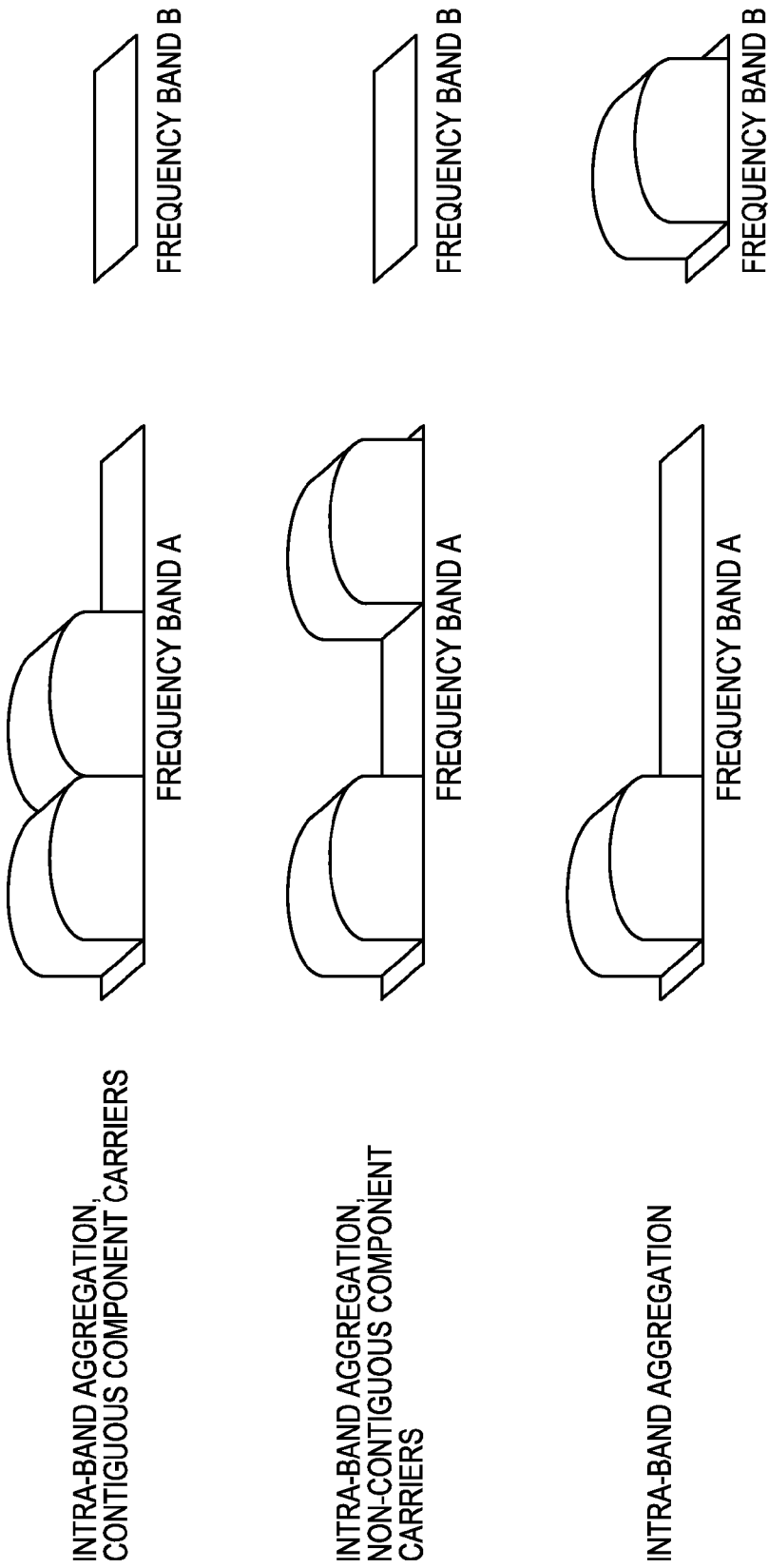
FIGS. 10A and 10B show carrier aggregation according to an embodiment of the invention.
Figure 10B:
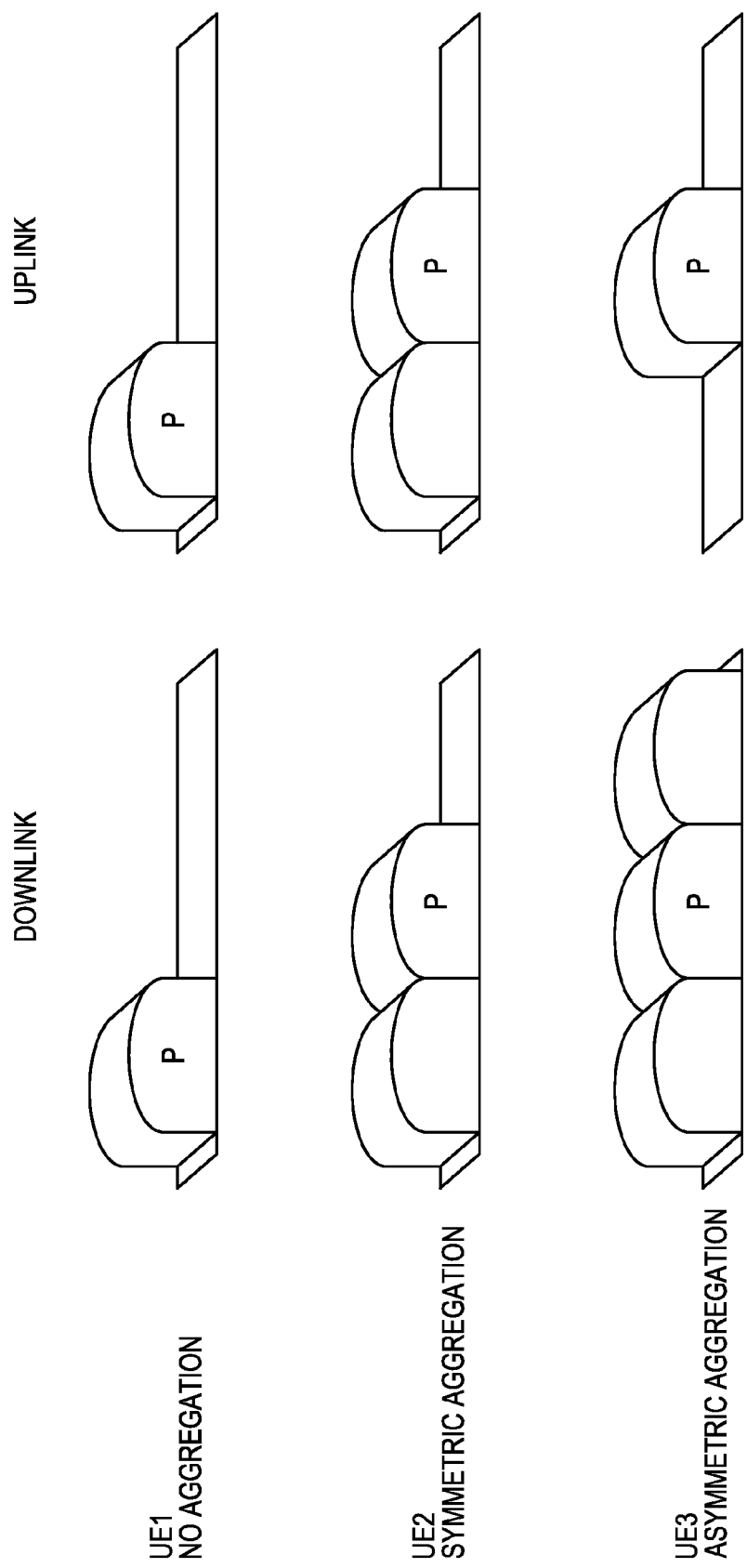

The component carriers in a CA scheme do not need to occupy contiguous frequencies. Referring to FIGS. 10A and 10B, three possible CA arrangements are depicted: (1) Intra-band aggregation with frequency-contiguous component carriers; (2) Intra-band aggregation with non-contiguous component carriers (3) Inter-band aggregation with non-contiguous component carriers.

A UE communicating in a CA scheme uses one downlink primary component carrier and a corresponding uplink primary component carrier. In addition, the UE may have one or several secondary component carriers in each direction. Furthermore, UEs do not have to use the same carriers as their primary component carrier. For example, FIG. 10B shows three UEs, each of which uses a different aggregation scheme: UE1 uses no aggregation, UE2 uses symmetric aggregation, and UE3 uses asymmetric aggregation. The primary component carrier for each UE is designate with the letter P.

UEs may vary in their ability to use CA. Some may be able to use CA while others may not. Furthermore, a UE may be capable of CA in the downlink direction, but not in the uplink direction (e.g., UE3 in FIG. 10B).

For a given UE, the NE with which it communicates on the primary carrier is referred to as the Pcell, while each of the one or more NEs that provide the one or more secondary carriers are referred to as an Scell.

PUCCH Formats

In accordance with an LTE embodiment of the invention, PUCCH supports multiple formats—Format 1, Format 1a, Format 1b, Format 2, Format 2a, Format 2b, and Format 3. Only Formats 1a, 1b, and 3 will be discussed herein.

A UE uses Format 1a and Format 1b to transmit scheduling requests and HARQ-ACKs to network entities. Descriptions may be found in the 3rd Generation Partnership Project (3GPP) technical specification TS 36.211, Section 5.4.1. In Format 1a, a UE uses a single HARQ acknowledgement bit related to one downlink component carrier to generate a BPSK symbol. If downlink spatial multiplexing is used, two acknowledgement bits are used to generate a QPSK symbol with Format 1b. In Format 1b with HARQ-ACK channel selection, the UE uses two bits and generates a QPSK symbol to convey up to four acknowledgement bits in PUCCH, when the UE is configured with more than one serving cell or, in the case of TDD, when the UE is configured with a single serving cell.

Format 1a/1b use seven OFDM symbols per slot (if a normal cyclic prefix is being used). When using Format 1a/1b, a UE transmits a length-12 sequence. Three of the symbols are used as reference signals to facilitate channel estimation by the network entity, and the remaining four are modulated by the BPSK/QPSK. Multiple UEs of a cell may transmit HARQ-ACKs on the same time-frequency resource using the same phase-rotated sequence and be separated through different orthogonal covers.

PUCCH Format 3 is often used to allow a UE to transmit a HARQ-ACK message with more than four bits. Format 3 is described in 3rd Generation Partnership Project (3GPP) technical specification TS 36.211, Section 5.4.2A.

Format 3 PUCCH subframes have seven OFDM symbols per slot. In a normal cyclic prefix case, the UE uses two of the symbols of each slot for reference signal transmission. The UE uses the remaining 5 symbols to transmit data. In each slot, the block of 12 DFT-precoded QPSK symbols is transmitted in the five available OFDM symbols.

PUCCH Resources

A PUCCH resource according to an LTE embodiment of the invention will now be described. A PUCCH resource is a number that determines three things: the resource blocks on which the UE should transmit the PUCCH, the orthogonal sequence index it should use, and cyclic shift that it should use. One type of PUCCH resource, denoted $n_{(1)\_PUCCH}$, is used for stand-alone hybrid ARQ acknowledgements in PUCCH Formats 1a and 1b. To calculate $n_{(1)\_PUCCH}$, a UE uses the index of the first control channel element (CCE) that the network entity used for its downlink scheduling command.

If the UE is using HARQ multiplexing in a TDD implementation, then it may need to transmit more than two HARQ-ACKs in one subframe. To accomplish this, the UE can transmit on up to four PUCCH resources—$n_{(1)\_PUCCH}$, 0 to $n_{(1)\_PUCCH}$, 3, which the UE calculates from the first CCE as described previously. If the UE needs to send CSI at the same time it needs to transmit a HARQ-ACK, then it compresses the HARQ-ACKs down to two bits, multiplexes them with CSI report, and sends them on the PUCCH resource $n_{(2)\_PUCCH}$ with PUCCH format 2/2a/2b, which is UE-specific and configured by higher layers for each serving cell.

D2D Communication

Figure 11:
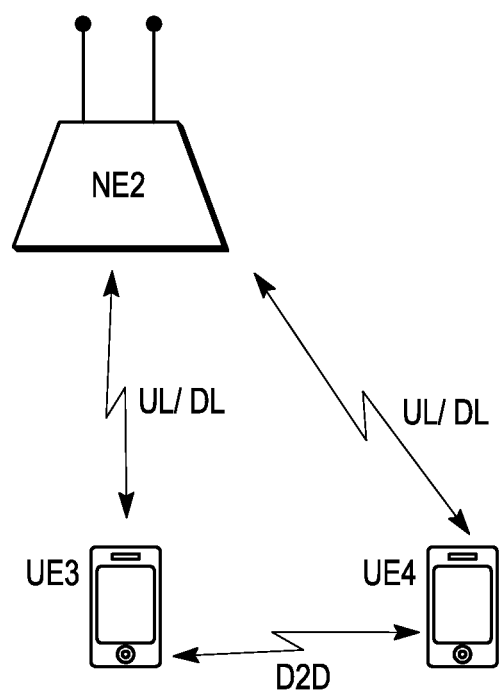
FIG. 11 shows D2D communication according to an embodiment of the invention.

Referring to FIG. 11, a D2D communication scheme in accordance with an embodiment of the invention will now be described. In this embodiment, a network entity initiates D2D communication by allocating the appropriate time-frequency resources to the UEs, which the UEs use to communicate with one another, and ordering or permitting the UEs to communicate directly with one another using the allocated resources. The time-frequency resources allocated to the UEs may be UL resources (e.g., UL RBs), or DL resources (e.g., DL RBs). For example, the network entity may allocate one or more resource blocks of an UL subframe or a DL subframe to the UEs.

In an embodiment of the invention, D2D-allocated UL or DL RBs may occur periodically, such as in every frame or in every subframe. Using these allocated RBs, UE1 and UE2 establish a data stream, which, for example, is structured as a series of time-duplexed subframes or slots, in which each subframe or slot uses one or more RB of the UL or the DL carriers. In one embodiment, the RBs used by the UEs are taken from the UL subframes, and these RBs are selected from the PUCCH of the UL carrier.

Modifying HARQ-ACK Feedback Timing to Accommodate D2D Communication

For regular communication with a network entity when operating in TDD mode, the UEs of a particular cell use a single (first) HARQ-ACK timing scheme based on a single UL/DL configuration. In order to facilitate D2D communication according to an embodiment of the invention, a UE may, if necessary, switch to a second HARQ-ACK timing scheme based on another UL/DL configuration in the uplink direction (i.e., to ACK/NACK downlink transmissions received from the NE). The first UL/DL configuration (non-D2D) will sometimes be referred to herein as the cell-specific UL/DL configuration. The second UL/DL configuration will sometimes be referred to as the D2D DL-reference UL/DL configuration.

As will be discussed, a UE can obtain the identity of the D2D DL-reference UL/DL configuration from a network entity, either explicitly or implicitly, or can determine the configuration on its own.

According to an embodiment of the invention, one reason for the switch from a first to a second HARQ-ACK timing scheme is as follows. If a UE engages in D2D communication, that UE will require at least one UL subframe for D2D communication. Consequently, that subset of UL subframes will not be available to the UE for uplink communication with the network entity. This unavailability effectively reduces the number of UL subframes allocated per the UL/DL configuration being used. Thus, if configuration #0 of FIG. 8A is supposed to be used, and the UE needs to use two of the UL subframes (e.g., UL subframes 4 and 9) for D2D communication, then the number of subframes available for the UE to send HARQ-ACK messages responsive to DL transmissions from the NE is reduced from 6 per frame to 4 per frame. To compensate for this change, the UE or network entity modifies the uplink HARQ-ACK scheme by switching from the first HARQ-ACK timing to the second HARQ-ACK timing.

Referring to Table 3, an example of how such modifications are made in an embodiment of the invention is shown. The data in Table 3 presupposes that the cell-specific configuration is configuration #0. In practice, Table 3 acts as mapping from D2D subframe assignments to D2D DL-reference UL/DL configurations.

TABLE 3

| UL/DL configuration | D2D Subframes (uplink subframes assigned as D2D subframes) | D2D DL-reference UL/DL configurations |
|---|---|---|
| 0 [no HARQ-ACK feedback on subframes (3, 8)] | (4) or (3, 4) | Config #1 or Config #6 (for all DL subframes), or HARQ-ACK for DL subframes 0, 1 on UL subframe 7 following config #1 timing (i.e, HARQ-ACK timing for DL subframe 0 associated with a UL D2D assigned subframe 4 following timing of config #1) |
| | (9) | Config #1 or Config #6 (for all DL subframes), or HARQ-ACK for DL subframes 5, 6 on UL subframe 2 following config #1 timing |
| | (4, 9) | Config #1 or Config #6 |
| | (8, 9) | Config #1 or HARQ-ACK for DL subframes 5, 6 on UL subframe 2 following config #1 timing |
| | (3) or (8) | No impact - no HARQ-ACK feedback on subframes (3, 8) |
| | (7) | HARQ-ACK for DL subframes 1 on UL subframe 8 |
| | (7, 8) | HARQ-ACK for DL subframes 1, 5 on UL subframe 9 |
| | (7, 8, 9) | Config #3 |

Further embodiments will now be described in the context of different scenarios.

A UE can learn of its D2D DL-reference UL/DL configuration in various ways. In one embodiment, the network entity uses dedicated higher layer (e.g., RRC) signaling to inform the UE which configuration it is to use as its D2D DL-reference UL/DL configuration. This D2D DL-reference UL/DL configuration may be used for HARQ-ACK timing for all DL subframes that the UE receives from the network entity. Alternatively, HARQ-ACK timing of the D2D DL-reference UL/DL configuration may be used only for the DL subframes that are ordinarily ACK/NACK-ed in the subframes now being used by the UE for D2D.

In another embodiment, the UE selects a D2D DL-reference UL/DL configuration according to a predefined rule (e.g. mapping from D2D subframe assignments to D2D DL-reference UL/DL configurations) or uses a default UL/DL configuration that is specified, for example, in an industry-wide communication standard, and which is stored in the memory 308 of the UE (FIG. 3).

To select a D2D DL-reference UL/DL configuration according to an embodiment of the invention, a UE or network entity uses the following criteria: (a) the D2D DL-reference UL/DL configuration should have UL subframes other than those being used for D2D, and (b) a set of UL subframes in the D2D DL-reference UL/DL configuration, which are used for transmitting HARQ-ACK messages of DL subframes of the cell-specific UL/DL configuration, should be a subset of UL subframes available in the cell-specific UL/DL configuration after subtracting the D2D subframes. In other words, a D2D DL-reference UL/DL configuration should be chosen such that the UE transmits HARQ-ACK messages to the network entity over a subset of the UL subframes of the cell-specific UL/DL configuration.

If there are multiple UL/DL configurations that satisfy these criteria, the D2D DL-reference UL/DL configuration may be chosen from them based on additional criteria. For example, the D2D DL-reference UL/DL configuration may be (1) the UL/DL configuration having the largest number of UL subframes available for UL HARQ-ACK messages responsive to DL subframes of the cell-specific UL/DL configuration; (2) the UL/DL configuration with the minimum HARQ-ACK delay; and/or (3) the UL/DL configuration with the minimum HARQ-ACK delay and with the smaller number of DL subframes associated with a single available UL subframe for HARQ-ACK.

Scenario 1

An example of how a UE obtains its UE-specific D2D DL-reference UL/DL configuration will now be described. In this example, NE2 (FIG. 11) has a cell-specific UL/DL configuration of 0, and has allocated UL subframes 4 and 9 for D2D communication between UE3 and UE4. To compensate for the loss of these UL subframes to HARQ-ACK, UE4 selects a second UL/DL configuration for HARQ-ACK timing. Since only UL subframes 2, 3, 7, and 8 remain available for transmitting HARQ-ACK messages, UE4 needs to select a configuration in which UL subframes available for transmitting HARQ-ACK messages of DL subframes 0, 1, 5, and 6 are a subset of subframes 2, 3, 7, and 8. UL/DL configurations #1, #2, #4, #5, and #6 meet these criteria. In this example, it will be assumed that UE4 selects UL/DL configuration #6, since four UL subframes (subframe 2, 3, 7 and 8) are used for transmitting HARQ-ACK messages of DL subframes 0, 1, 5, and 6 in UL/DL configuration #6, whereas other candidate UL/DL configurations (#1, #2, #4, and #5) have, at most, two available UL subframes for the UE to transmit HARQ-ACK messages. UE4 then communicates with UE3 using D2D, and communicates with the NE2 using the uplink HARQ-ACK timing scheme of UL/DL configuration #6.

Alternatively, UE4 may select UL/DL configuration #1 as a D2D DL-reference UL/DL configuration, since UL/DL configuration #1 has a shorter HARQ-ACK delay than configuration #6 and has the maximum two DL subframes associated with a single UL subframe for HARQ-ACK.

Scenario 2

Another example will now be described. In this example, assume that NE2 is the only serving cell for UE3 and UE4 (FIG. 11), and that NE2 uses UL/DL configuration #0, and has allocated subframes 3, 4, 8, and 9 to UE3 and UE4 for conducting D2D communication with each other. This leaves UL subframes 2 and 7 available for UE3 and UE4 to use for transmission to NE2. In order to adjust for the loss of UL subframes 3, 4, 8, and 9, UE4 obtains a second uplink HARQ-ACK timing based on a more appropriate UL/DL configuration—one whose UL subframes used for transmitting HARQ-ACK messages of DL subframes 0, 1, 5, and 6 are a subset of subframes 2 and 7. In this example, UL/DL configuration #1, #2, and #5 meet this criterion. Since UL/DL configuration #1 has the shortest HARQ-ACK delay and the smallest number of DL subframes associated with a single UL subframe for HARQ-ACK, UL/DL configuration #1 becomes UE4's D2D DL-reference UL/DL configuration. As available DL subframes do not change as a result of the D2D communication, NE2 does not need to change the HARQ-ACK timing in the downlink direction (i.e., to ACK/NACK uplink transmissions received from UE4). Thus, in this example, the network entity would use the downlink HARQ-ACK timing of UL/DL configuration #0. However, UE4 will not monitor HARQ-ACK messages sent by NE2 or uplink scheduling messages for subframes 3, 4, 8, and 9, since UE4 is using these subframes to engage in D2D communication with UE3.

Scenario 3

In another example, NE2 (FIG. 11) has a cell-specific UL/DL configuration of 0, and has allocated UL subframe 4 for D2D communication between UE3 and UE4. Then, UL subframes 2, 3, 7, 8, and 9 remain available for transmitting HARQ-ACK. In this example, UE3 selects UL/DL configuration #1 as a D2D DL-reference UL/DL configuration, which has shorter HARQ-ACK delay than UL/DL configuration #6 and has the smaller number of DL subframes associated with a single available UL subframe for HARQ-ACK compared to UL/DL configurations #2, #4, and #5. Furthermore, UE3 uses uplink HARQ-ACK timing of the D2D DL-reference UL/DL configuration only for the DL subframes whose HARQ-ACK messages are supposed to be transmitted on UL subframes assigned for D2D communication. That is, while a HARQ-ACK message for DL subframes 0 is transmitted on UL subframe 7 according to uplink HARQ-ACK timing of UL/DL configuration #1, a HARQ-ACK message for DL subframe 5 is transmitted on UL subframe 9 according to the cell-specific UL/DL configuration of #0.

The above process for determining which D2D DL-reference UL/DL configuration is to be used by UE4 does not have to be performed by the UE. In some embodiments, the network, and not the UE, makes this determination, possibly by using the same criteria described above.

Other ways in which a UE can obtain its D2D DL-reference UL/DL configuration in various embodiments of the invention will now be described. In the initial set-up of D2D communication, the network entity identifies, to the UE, a first UL/DL configuration—i.e., the cell-specific UL/DL configuration. The NE then identifies, to the UE, a second UL/DL configuration—i.e., the D2D DL-reference UL/DL configuration. The NE may transmit information regarding the identity of the first UL/DL configuration via broadcast signaling and the identity of the second UL/DL configuration to the UE via dedicated higher layer (e.g., RRC) signaling. By comparing the set of UL subframes of the first configuration with the set of UL subframes of the second configuration, UE determines which UL subframes it is to use for D2D communication—e.g., based on which UL subframes the two configurations have in common. The UE performs uplink HARQ-ACK feedback to the NE according to the HARQ-ACK feedback timing of the D2D DL-reference UL/DL configuration.

In another embodiment, the NE identifies to the UE the UL subframes that are assigned to the UE for D2D communication. The NE may signal (e.g., via dedicated higher-layer signaling), to the UE, the identity of the UL subframes assigned for D2D communication. The UE then determines the D2D DL-reference UL/DL configurations based on the assigned D2D UL subframes and on the cell-specific UL/DL configuration. The UE carries out HARQ-ACK feedback for DL subframes according to the HARQ-ACK feedback timing of the D2D DL-reference UL/DL configuration.

According to other embodiments, the UE or NE determines the D2D DL-reference UL/DL configuration by referencing one or more tables (stored in a memory of the UE4 or NE2), such as one or more of Tables 1 through 3.

TDD Uplink HARQ-ACK Feedback Timing and PUCCH Resource Changes Due to D2D Communication According to an embodiment of the invention, UEs carry out uplink HARQ-ACK feedback according to one or more rules. Examples of such rules that may be implemented in an LTE embodiment of the invention will now be described. It is to be understood that the UE may apply all or some subset of these rules.

In TDD operating mode, the set of DL subframes (denoted as $K_c$, will be referred to herein as a downlink association set) on serving cell c associated with UL subframe n for uplink HARQ-ACK feedback are the DL subframes n−k, where k∈K (values for k shown in Table 2) and K is determined according to a cell-specific UL/DL configuration. In an embodiment of the invention, if a UE is engaged in D2D communication using some of UL subframes, downlink association sets for one or more available UL subframes are determined according to combination of a cell-specific UL/DL configuration, a D2D DL-reference UL/DL configuration, and D2D subframe allocation. The UE may use the DL-reference UL/DL configuration for HARQ-ACK feedback timing for all DL subframes of the serving cell c or for only the DL subframes associated with the UL D2D assigned subframe.

The DL subframe or subframes in which PHICH (HARQ-ACK for PUSCH, i.e. downlink HARQ-ACK feedback) occurs, and in which PUSCH scheduling grant transmissions occur follow the scheme of the cell-specific UL/DL configuration. However, the UE does not monitor PHICH or PUSCH grants for the subframes that the UE uses for D2D communication. In Scenario 2, for example, the UE would not monitor the PHICH or monitor for PUSCH grants for subframes 3, 4, 8, or 9.

For a UE Configured with One Serving Cell:

For a UE configured with PUCCH format 1b with channel selection and HARQ-ACK multiplexing mode (as set forth, for example, in 3GPP TS 36. 213 V11.1.0) for HARQ-ACK transmission:

If the UE uses the PUCCH to transmit a HARQ-ACK: The UE structures the uplink HARQ-ACK feedback on UL subframe n using HARQ-ACK bit values and a downlink association set for UL subframe n, as set forth in the LTE standard. In LTE Rel-11, for example, the UE would structure the uplink HARQ-ACK feedback according to the tables found in 3GPP TS 36.213, section 10.1.3 "TDD HARQ-ACK feedback procedures." One such table is reproduced herein as Table 2. When the D2D-engaged UE structures the uplink HARQ-ACK feedback, the UE may modify the downlink association set and calculate the size M of the modified downlink association set as follows: $M=M_r-D-S-U$, where $M_r$ is the number of elements in the set K defined in Table 10.1.3.1-1 (in 3GPP TS 36.213) associated with subframe n according to the D2D DL-reference UL/DL configuration, D is the number of D2D subframes configured in the set K, and S=1 if the set K includes a special subframe configuration 0 or 5 with normal downlink CP or configuration 0 and 4 with extended downlink CP otherwise S=0, U is the number of subframes in the set K which are available UL subframes for the serving cell, c determined by the cell-specific UL/DL configuration and D2D subframe allocation. M+S is the number of elements in the set $K_c$ including special subframes.

In some embodiments, S=0 regardless of the special subframe configuration.

In Scenario 2, for example, if UL/DL configuration #2 is selected as a D2D DL-reference UL/DL configuration, then for UL subframe n=2, $M_r=4$, D=2 (subframes 4, 8), S=0, U=0, thus, M=2.

If M=0 on UL subframe n, there would be no HARQ-ACK feedback on UL subframe n. For example, in Scenario 2, if the D2D DL-reference UL/DL configuration is #1, then for UL subframe n=3, $M_r=1$, D=1 (subframes 9), S=0, U=0, thus, M=0.

For HARQ-ACK transmission in an UL subframe n, if the cell-specific DL-reference UL/DL configuration is #0, or if HARQ-ACK transmission occurs on PUSCH not adjusted by an UL grant, the number of HARQ-ACK feedback bits is $O^{ACK}=M=M_r-D-S-U$.

For HARQ-ACK transmission in an UL subframe n and cell-specific DL-reference UL/DL configurations #1 through #6, if HARQ-ACK is transmitted on PUSCH adjusted by an UL grant, the number of HARQ-ACK feedback bits is based on the Downlink Assignment Index (DAI) value indicated in the UL Grant, as is described, for example, in LTE Rel-11 (3GPP TS 36. 213 V11.1.0).

In another embodiment, instead of the above modifications on downlink association sets, the UE uses the LTE Rel-11 mapping table for downlink association sets with Rel-11 M values, and sets HARQ-ACK bits for subframes within Rel-11 downlink association sets, which correspond to D2D subframes or available UL subframes, to DTX or NACK. For example, in Scenario 2, if the D2D DL-reference UL/DL configuration is configuration #2, HARQ-ACK bits for subframes 4 and 8 are set to DTX (when transmitted on PUCCH) or NACK (when transmitted on PUSCH) to construct HARQ-ACK feedback on UL subframe 2.

For a UE Configured with HARQ-ACK Bundling Mode for HARQ-ACK Transmission (PUCCH Format 1a/1b):

The UE carries out HARQ-ACK bundling according to modified downlink association sets of the D2D DL-reference UL/DL configuration. It would be assumed that there would be no PDSCH or DL SPS release PDCCH on the D2D subframes or the available UL subframes. Thus, the size M of the modified downlink association set is determined as follows: $M=M_r-D-S-U$, where $M_r$ is the number of elements in the set K defined in Table 10.1.3.1-1 (in 3GPP TS 36.213) associated with subframe n according to the D2D DL-reference UL/DL configuration, D is the number of D2D subframes configured in the set K, and S=1 if the set K includes a special subframe configuration 0 or 5 with normal downlink CP or configuration 0 and 4 with extended downlink CP otherwise S=0, U is the number of subframes in the set K which are available UL subframes for the serving cell, c determined by the cell-specific UL/DL configuration and D2D subframe allocation. M+S is the number of elements in the set K including special subframes.

For example, in Scenario 2, if the D2D DL-reference UL/DL configuration is #1, the UE would assume that there would be no PDSCH or DL SPS release PDCCH on subframes 4 and 9. Thus, the UE would not detect PDSCH transmission and/or PDCCH indicating downlink SPS release in the subframes configured for D2D transmissions, as expected. Furthermore, the UE would not transmit HARQ-ACK messages for subframes 4 and 9 on UL subframes 3 and 8.

For a UE Configured with PUCCH Format 3 for HARQ-ACK Transmission:

The UE would use $B_c^{DL}$ to determine the number of HARQ-ACK feedback bits, $O_c^{ACK}$. For TM supporting 1 transport block or spatial HARQ-ACK bundling is applied, $O_c^{ACK}=B_c^{DL}$. Otherwise, $O_c^{ACK}=2B_c^{DL}$.

If the UE transmits HARQ-ACK on the PUCCH or on a PUSCH not adjusted by an UL grant or if the serving cell TDD UL/DL configuration is #0: $B_c^{DL}=M_r-D-S-U$, where $M_r$ is the number of elements in the set K defined in Table 10.1.3.1-1 (in 3GPP TS 36.213) associated with subframe n, D is the number of D2D subframes configured in the set K, and S=1 if the set K includes a special subframe configuration 0 or 5 with normal downlink CP or configuration 0 and 4 with extended downlink CP otherwise S=0. U is the number of subframes in the set K which are available UL subframes for the serving cell, C. $B_c^{DL}+S$ is the number of elements in the set $K_c$ including special subframes.

In some embodiments, S=0 regardless of the special subframe configuration.

In Scenario 2, if the D2D DL-reference UL/DL configuration is #2, for UL subframe n=2, $M_r=4$, D=2 (subframes 4, 8), S=0, U=0 thus, $B_c^{DL}=2$.

If the UE transmits HARQ-ACK in UL subframe n and on PUSCH adjusted by an UL grant and for cell-specific DL-reference UL/DL configurations #1 through #6, the number of HARQ-ACK feedback bits is based on the DAI value indicated in the UL Grant, as is described, for example, in LTE-Rel 11.

In another embodiment, instead of the above modifications on downlink association sets, the UE uses Rel-11 downlink association sets of the D2D DL-reference UL/DL configuration (e.g. UL/DL configuration #2) with setting HARQ-ACK bits for D2D subframes (e.g. 3, 4, 8, and 9) and available UL subframes to NACK.

For a UE Configured with More than One Serving Cell (Regardless of Whether All Configured Serving Cells Use the Same Cell-Specific DL-Reference UL/DL Configuration or Different Ones):

If inter-band CA with full-duplex capability (i.e. allowing UE to simultaneously transmit and receive in different frequency bands) is used, the PDSCH HARQ timing and uplink HARQ-ACK feedback timing are based on a downlink timing reference UL/DL configuration (will be referred to herein as "DL-reference UL/DL configuration") which is determined from the D2D DL-reference UL/DL configuration in the serving cell where D2D subframes are configured for the UE (will be referred to herein as "D2D cell") and the cell-specific UL/DL configuration in the other serving cell. Mechanisms similar to the ones being defined in Rel-11 for the case of TDD inter-band CA with different UL/DL configurations in different bands can be used to determine the DL-reference UL/DL configuration.

If intra-band contiguous CA is used, uplink (or downlink) subframes for serving cells not configured for D2D communication are also unavailable for transmission (or reception) during D2D reception (or transmission) due to adjacent channel interference. Thus, the serving cells not configured for D2D communication also have D2D DL-reference UL/DL configurations, which are determined, based on the positions of D2D subframes in a series of subframes and cell-specific UL/DL configurations of the serving cells.

If inter-band CA with half-duplex capability (UE can only transmit or only receive at any given time on all aggregated carriers from different frequency bands) is used, downlink (or uplink) subframes for serving cells not configured for D2D communication are also unavailable during D2D transmission (or reception). Thus, each serving cell not configured for D2D communication also has a D2D reference UL/DL configuration, which is determined based on the positions of D2D subframes in a series of subframes and the cell-specific UL/DL configuration of the serving cell.

If intra-band contiguous CA or inter-band CA with half-duplex capability is used, the DL-reference UL/DL configuration is determined from D2D DL-reference UL/DL configurations of all serving cells for the D2D configured UE. Mechanisms similar to the ones being defined in Rel-11 for the case of TDD inter-band CA with different UL/DL configurations in different bands can be used to determine the DL-reference UL/DL configuration.

The value of $M_c$, the size of the downlink association set on UL subframe n for the serving cell c according to the determined DL-reference UL/DL configuration, is given by $M_c=M_r-D-S-U$, where $M_r$ is the number of elements in the set K defined in Table 10.1.3.1-1 (in 3GPP TS 36.213) and associated with UL subframe n for the DL-reference UL/DL configuration of the serving cell c, D is the number of D2D subframes configured in the set K, and S=1 if the set K includes a special subframe configuration 0 or 5 with normal downlink CP or special subframe configuration 0 and 4 with extended downlink CP otherwise S=0, U is the number of subframes in the set K which are UL subframes for the serving cell, c. $M_c+S$ is the number of elements in the set $K_r$, including the special subframes.

For a UE configured with PUCCH format 1b with channel selection for HARQ-ACK transmission, the UE uses the modified downlink association set $K_c$ for the serving cell c, which as explained above excludes D2D subframes and available UL subframes of the serving cell c from the LTE Rel-11 downlink association set of the determined DL-reference UL/DL configuration, with the $M_c$ value described above, in order to perform multi-cell HARQ-ACK reporting procedures as done for the case with different UL/DL configurations in Rel-11.

PUCCH Resource Provisioning

According to an embodiment of the invention, for the D2D and cellular hybrid UE, both uplink HARQ-ACK feedback timing and PUCCH resource provisioning for cellular communication are based on the rule of the D2D DL-reference UL/DL configuration, which is dedicatedly signaled or determined by UE. For most cases, PUCCH resource collision between cellular-only UEs and hybrid UEs may not occur, since PUCCH resources are dimensioned by the number of elements in the downlink association set and the PUCCH resource dimension of the cell-specific UL/DL configuration is likely to be different from that of the UE-specifically signaled (or determined) D2D UL/DL configuration on a given uplink subframe.

However, if those two UL/DL configurations have the same number of elements in downlink association sets of the given uplink subframe, PUCCH resource collision may occur. For example, assume that the cell-specific UL/DL configuration is #0 and the D2D DL-reference UL/DL configuration is #6 with subframe 9 being assigned for D2D communication. For UL subframe 2, the associated DL subframes are subframe 6 for the cell-specific UL/DL configuration of #0 and subframe 5 for the D2D DL-reference UL/DL configuration of #6, respectively. A PUCCH resource collision occurs on uplink subframe 2, if PDSCH of a cellular-only UE is scheduled on subframe 6 and PDSCH of a hybrid UE is scheduled on subframe 5 with the same first CCE number used for transmission of corresponding two PDCCHs. In one embodiment, increasing the PUCCH resource dimension by one for the hybrid UE on the given uplink subframe is used to avoid potential PUCCH collision.

TABLE 4

Transmission of HARQ-ACK multiplexing for M = 2

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | | No transmission |

In an LTE embodiment, the PUCCH resources for HARQ-ACK bundling or HARQ-ACK multiplexing with M=1 (PUCCH format 1a/1b) in one configured serving cell, where M is the number of elements in the downlink association set, for antenna ports $p_0$ and $p_1$, respectively, are given by $$n_{PUCCH}^{(1,\tilde{p}0)}=(M'-m-1)\cdot N_c+m\cdot N_{c+1}+n_{CCE}+N_{PUCCH}^{(1)},$$

$$n_{PUCCH}^{(1,\tilde{p}1)}=(M'-M-1)\cdot N_c+m\cdot N_{c+1}+n_{CCE}+N_{PUCCH}^{(1)}+1,$$

where
  $M'=M+1$
  $N_c=\max\{0,\lfloor[N_{RB}^{DL}\cdot(N_{sc}^{RB}\cdot c-4)]/36\rfloor\}$, where c is selected from $\{0, 1, 2, 3\}$ such that $N_c\leq n_{CCE}<N_{c+1}$, $N_{RB}^{DL}$ is downlink bandwidth configuration, expressed as a number of resource blocks, $N_{sc}^{RB}$ is a resource block size in the frequency domain, expressed as a number of subcarriers.
  $n_{CCE}$ is the number of the first CCE used for transmission of the corresponding PDCCH in subframe $n-k_m$ and the corresponding m, where $k_m$ is the smallest value in the downlink association set such that UE detects a PDCCH in subframe $n-k_m$.
  $N_{PUCCH}^{(1)}$ is configured by higher layers.

For HARQ-ACK multiplexing with M>1 (PUCCH format 1b with channel selection, an example case of M=2 shown in Table 4) in one configured serving cell, the PUCCH resource $n_{PUCCH,i}^{(1)}$ for a PDSCH transmission indicated by the detection of corresponding PDCCH or a PDCCH indicating downlink SPS release in subframe $n-k_i$, where $k_i$ is the element of the downlink association set and $0\leq i\leq M-1$, is given by $$n_{PUCCH,i}^{(1)}=(M'-i-1)\cdot N_c+i\cdot N_{c+1}+n_{CCE,i}+N_{PUCCH}^{(1)},$$
where $M'=M+1$, $N_c=\max\{0, \lfloor[N_{RB}^{DL}\cdot(N_{sc}^{RB}\cdot c-4)]/36\rfloor\}$, where c is selected from $\{0, 1, 2, 3\}$ such that $N_c\leq n_{CCE,i}<N_{c+1}$, $N_{RB}^{DL}$ is downlink bandwidth configuration, expressed as a number of resource blocks, $N_{sc}^{RB}$ is a resource block size in the frequency domain, expressed as a number of subcarriers.
  $n_{CCE,i}$ is the number of the first CCE used for transmission of the corresponding PDCCH in subframe $n-k_i$.
  $N_{PUCCH}^{(1)}$ is configured by higher layers.

When the UE is configured with more than one serving cell, increasing the PUCCH resource dimension by one to avoid potential PUCCH resource collision as described above is also applicable to determine the PUCCH resources for PUCCH format 1b with channel selection, which are based on the first CCE number of the corresponding PDCCH and dimensioned by the number of elements in the downlink association set according to LTE Rel-11.

In another embodiment, in case of potential PUCCH collision, the network may configure by higher-layers the PUCCH resource for DL subframes associated with the UL D2D assigned subframe. For the example case that the cell-specific UL/DL configuration is #0 and the D2D DL-reference UL/DL configuration is #6 with subframe 9 being assigned for D2D communication, PUCCH resource on UL subframe 2 for HARQ-ACK message of DL subframe 5 associated with UL subframe 9 is configured by higher-layer signaling. In yet another embodiment, the PUCCH resource is indicated to the UE in the control channel (E)PDCCH assigning the PDSCH in the DL subframe. The UE may be configured with P PUCCH resources semi-statically by higher-layer signaling and be dynamically indicated as for which resource to use out of the P PUCCH resources.

Adjusting the Number of HARQ Processes to Accommodate D2D Communication

In some embodiments, a UE may also need to adjust the number of HARQ processes both for DL and UL. If uplink HARQ-ACK feedback timing for all available DL subframes in a serving cell follows the rule of the D2D DL-reference UL/DL configuration (e.g., UL/DL configuration #2 in Scenario 2), DL HARQ timing is also determined based on the D2D DL-reference UL/DL configuration. However, the reserved subframes for D2D communication (e.g. subframes #3, 4, 8, and 9) are neither available DL subframes nor available UL subframes. In addition, some subframes in a set of DL subframes of the D2D DL-reference UL/DL configuration may correspond to available UL subframes of the serving cell according to the cell-specific UL/DL configuration. Thus, the number of DL HARQ processes for the hybrid UE is determined as follows: The number of DL HARQ processes for the UE=the number of DL HARQ processes in the D2D DL-reference UL/DL configuration−the number of reserved subframes for D2D communication plus the number of available UL subframes of the serving cell in a set of DL subframes within a radio frame according to the D2D DL-reference UL/DL configuration Similarly, the number of UL HARQ processes can be updated as follows: The number of UL HARQ processes for the UE=the number of UL HARQ processes in the cell-specific UL/DL configuration−the number of reserved subframes for D2D communication within a radio frame Referring to FIG. 13, a scenario in which UE3 and UE4 (FIG. 1) engage in D2D communication according to an embodiment of the invention will now be described.

Figure 13:
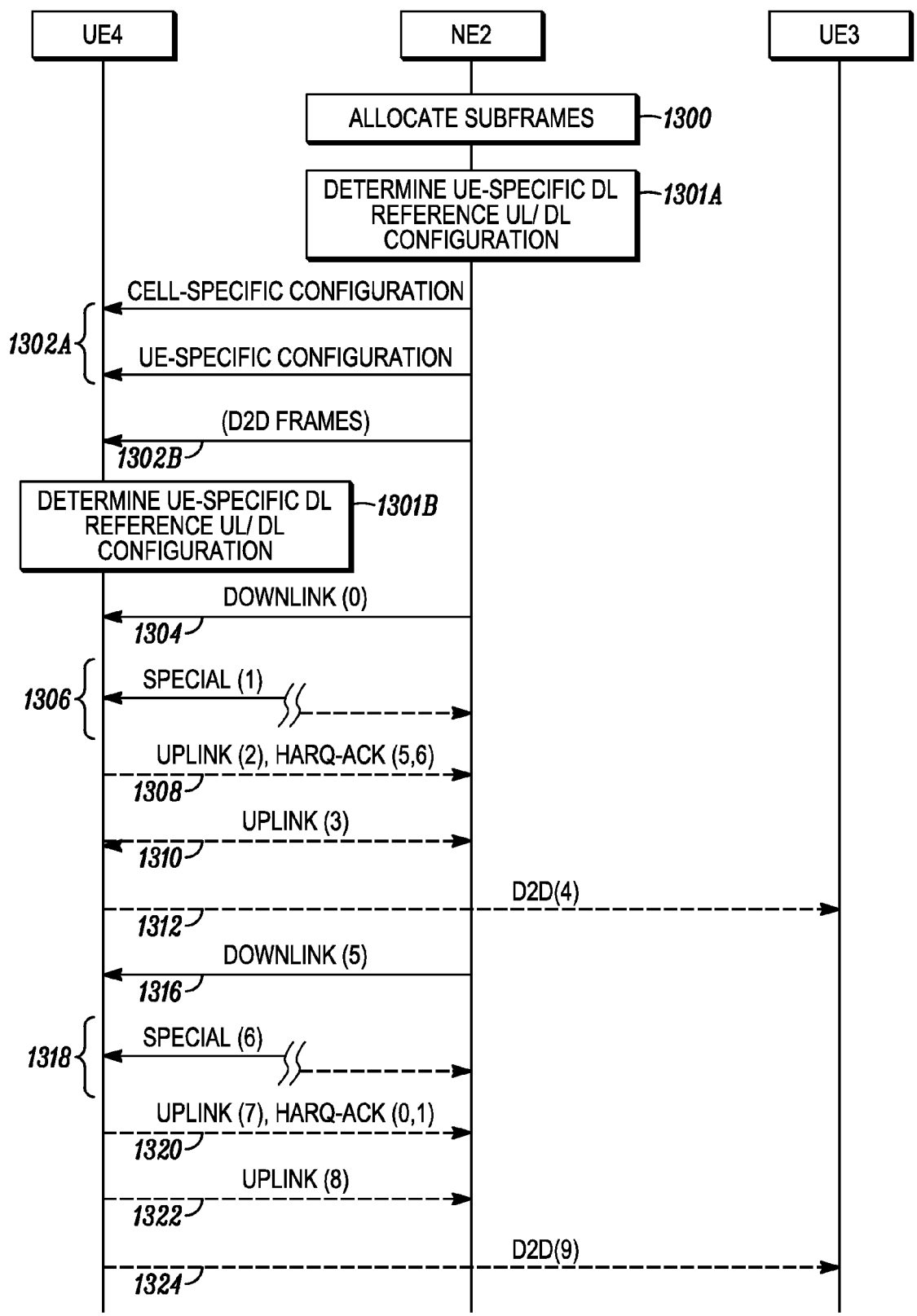
FIG. 13 shows an example of communication using various embodiments of the invention.

Steps 1304-1324 in FIG. 13 are annotated to show the subframe number in which transmission is taking place, and which DL subframes the HARQ-ACK messages are responsive to.

Figure 12:
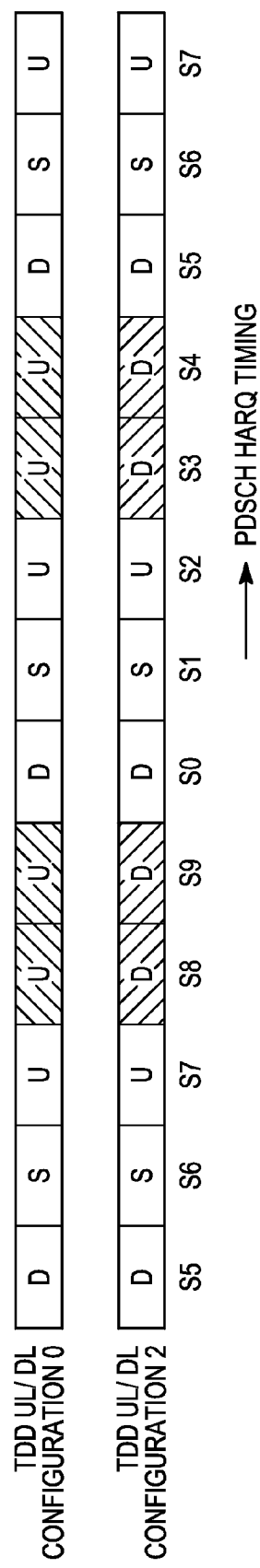
FIG. 12 illustrates changing PDSCH HARQ from a first UL/DL configuration to a second UL/DL configuration.

It will be assumed in this scenario that the network 100 is a TDD LTE network, and NE2 has already determined that D2D communication between UE3 and UE4 is desirable. It will also be assumed that UL/DL configuration #0 (FIG. 12) has been established as the cell-specific configuration for cell C2.

At step 1300, NE2 signals the cell-specific UL/DL configuration via broadcast signaling and allocates subframes for the D2D communication. In this example, NE2 allocates UL subframe 4 and UL subframe 9 for D2D. At step 1301, NE2 determines the D2D DL-reference UL/DL configuration for UE3. NE2 makes this determination based on one or more of the criteria described above. In this example, it will be assumed that NE2 has chosen UL/DL configuration #1 to be UE3's D2D DL-reference UL/DL configuration. At step 1302A, NE2 signals the D2D DL-reference UL/DL configuration to UE3 via dedicated signaling.

Alternatively, NE2 performs step 1302B, at which it signals the location (e.g., time, frequency, subframe number, etc.) of the subframes to be used by UE3 for D2D communication with UE4. At step 1302C, UE3 would then determine which UL/DL configuration to use as its D2D DL-reference UL/DL configuration based on the criteria described earlier. If UE3 makes the configuration determination, then the NE2 may not need to perform steps 1301 and 1302A, but only 1302B and 1302C. In such case, UE3 would signal NE2 to inform NE2 regarding which UL/DL configuration UE3 has determined to use as its D2D DL-reference UL/DL configuration. Another alternative is that NE2 performs step 1302B and both NE2 and UE3 perform step 1301 and 1302C, respectively, according to a predefined rule, which is stored in memories of NE2 and UE3. In either case, UE3 will use UL/DL configuration #1 for HARQ-ACK feedback timing.

At steps 1304 to 1324, UE3 alternates between receiving data on DL subframes and special subframes from NE2 (steps 1304, 1306, 1316 and 1318), transmitting data on UL subframes and special subframes (steps 1306, 1308, 1310, 1318, 1320, and 1322), transitioning from DL to UL in special subframes (steps 1306 and 1318), and engaging in D2D with UE4 (steps 1312 and 1324).

At step 1308 (UL subframe 2), UE3 transmits a HARQ-ACK message in response to transport blocks that UE3 received in DL subframe 5 and special subframe 6 (of the previous frame). At step 1320 (UL subframe 7), UE3 transmits a HARQ-ACK message in response to transport blocks that UE3 received in DL subframe 0 and special subframe 1 (of the current frame).

The terms, descriptions and figures used herein are set forth by way of illustration only and are not meant as limitations.

For example, in the present disclosure, when two or more components are "electrically coupled," they are linked such that electrical signals from one component will reach the other component, even though there may be intermediate components through which such signals may pass.

For example, interactions between UEs and NEs are often described as occurring in a particular order. However, any suitable communication sequence may be used.

LIST OF ACRONYMS

BS Base Station
CA Carrier Aggregation
CCE Control Channel Element
CoMP Coordinated Multi-Point
CP Cyclical Prefix
CQI Channel Quality Indicator
CRC Cyclic Redundancy Check
C-RNTI Cell RNTI
CRS Common Reference Signal
CSI Channel State Information
CSI-RS Channel State Information Reference Signal
CSS Common Search Space
D2D Device to Device
D2D-SCH D2D Shared Channel
DCI Downlink Control Information
DL Downlink
DL-SCH Downlink Shared Channel
DM-RS Demodulation Reference Signal
DFT-SOFDM Discrete Fourier Transform Spread OFDM
eNB Evolved Node B
EPBCH Enhanced Physical Broadcast Channel
EPDCCH Enhanced Physical Downlink Control Channel
EPRE Energy Per Resource Element
E-UTRA Evolved UTRA
FDD Frequency Division Duplex
FFT Fast Fourier Transform
GPS Global Positioning System
HARQ Hybrid Automatic Repeat Request
IMEI International Mobile station Equipment Identity
LBRM Limited Buffer Rate Matching
LTE Long-Term Evolution
MAC Media Access Control
MBSFN Multicast-Broadcast Single Frequency Network
MCS Modulation and Coding Scheme
MIB Master Information Block
MIMO Multiple-Input Multiple-Output
MU-MIMO Multi-User MIMO
NFC Near Field Communication
OFDMA Orthogonal Frequency Division Multiple Access
P/S-SCH Primary/Secondary Synchronization Channel PBCH Primary Broadcast Control Channel
PCID Physical Cell Identifier
PDCCH Physical Downlink Control Channel
PDCP Packet Data Convergence Protocol
PDSCH Physical Downlink Shared Channel
PHICH Physical Hybrid ARQ Channel
PMI Precoding Matrix Indicators
PRB Physical Resource Block
P-RNTI Paging RNTI
PRS Positioning Reference Signal
PSS Primary Synchronization Signal
PTI Precoder Type Indication
PUCCH Physical Uplink Control Channel
PUSCH Physical Uplink Shared Channel
QAM Quadrature Amplitude Modulation
QPSK Quadrature Phase Shift-Keying
RACH Random Access Channel
RAT Radio Access Technology
RB Resource Block
RE Resource Element
REG Resource Element Group
RF Radio Frequency
RI Rank Indicator
RNC Radio Network Controller
RNTI Radio Network Temporary Identifier
RRC Radio Resource Control
RRH Remote Radio Head
RS Reference Symbol
RSRP Reference Signal Received Power
RSRQ Reference Signal Received Quality
RSSI Received Signal Strength Indicator
SC-FDMA Single-Carrier Frequency Division Multiple Access
SFN System Frame Number
SIB System Information Block
SI-RNTI System Information RNTI
SPS Semi-Persistent Scheduling
SR Scheduling Request
S-RNTI Serving RNC RNTI
SRS Sounding Reference Signal
SSID Service Set Identifier
SSS Secondary Synchronization Signal
TB Transport Block
TDD Time Division Duplex
TM Transmission Mode
TP Transmission Point
TTI Transmission Time Interval
UE User Equipment
UERS UE-specific Reference Symbol
UL Uplink
UL-SCH Uplink Shared Channel
UMTS Universal Mobile Telecommunications System

The invention claimed is:

1. A method on a first UE, the method comprising:
receiving, from a network entity via broadcast signaling, a first uplink-downlink configuration, the first uplink-downlink configuration designating a first set of one or more subframes of a series of subframes as uplink subframes;
receiving, from the network entity via dedicated signaling, a second uplink-downlink configuration, the second uplink-downlink configuration designating a second set of one or more subframes of the series of subframes as uplink subframes;
wherein the first set of uplink subframes and the second set of uplink subframes differ from one another by at least one uplink subframe;
comparing the first set of uplink subframes with the second set of uplink subframes;
determining, based on the comparison of the first set of uplink subframes and the second set of uplink subframes, which subframe or subframes of the series are device-to-device subframes and which subframe or subframes of the series are HARQ-ACK subframes;
transmitting directly to a second UE and receiving directly from the second UE on one or more of the device-to-device subframes;
transmitting one or more uplink HARQ-ACK messages to the network entity on one or more of the HARQ-ACK subframes of the series; and
adjusting a number of HARQ processes based at least on a number of the subframes determined to be device-to-device subframes and the first uplink-downlink configuration.

2. The method of claim 1, further comprising:
receiving data from the network entity on a downlink subframe,
wherein, according to the first uplink-downlink configuration, the downlink subframe is associated with a device-to-device subframe of the one or more device-to-device subframes, and
wherein, according to the second uplink-downlink configuration, the downlink subframe is associated with a HARQ-ACK subframe of the one or more HARQ-ACK subframes.

3. The method of claim 1,
the method further comprising receiving data from the network entity on a downlink subframe,
wherein, according to the first uplink-downlink configuration, no device-to-device subframe of the one or more device-to-device subframes is associated with the downlink subframe,
wherein transmitting one or more uplink HARQ-ACK messages comprises
transmitting an uplink HARQ-ACK message on a first HARQ-ACK subframe, wherein, according to the first uplink-downlink configuration, the first HARQ-ACK subframe is associated with the downlink subframe; or
transmitting an uplink HARQ-ACK message on a second HARQ-ACK subframe, wherein, according to the second uplink-downlink configuration, the second HARQ-ACK subframe is associated with the downlink subframe.

4. The method of claim 1,
wherein the one or more device-to-device subframes are not available for uplink HARQ-ACK feedback,
wherein the determining step comprises
comparing the first and second uplink-downlink configurations, and
selecting subframes to be used for device-to-device communication such that the remaining uplink subframes of the first uplink-downlink configuration are able to support uplink HARQ-ACK feedback based on the second uplink-downlink configuration.

5. The method of claim 1, further comprising:
determining an uplink control channel resource dimension based on the second uplink-downlink configuration; and
transmitting the one or more uplink HARQ-ACK messages on an uplink control channel resource having the determined dimension.

6. The method of claim 5, further comprising increasing the uplink control channel resource dimension by at least one if the first and the second uplink-downlink configurations have the same number of elements in downlink association sets of a given uplink subframe.

7. The method of claim 5,
wherein if the first and the second uplink-downlink configurations have the same number of elements in downlink association sets of a given uplink subframe, the network entity configures the uplink control channel resource for the first UE by using either a higher-layer signaling or a downlink control channel, or both.

8. The method of claim 1, further comprising
selecting subframes for monitoring for downlink HARQ-ACK feedback and for monitoring for uplink scheduling grant signals according to the first uplink-downlink configuration such that
the first UE does not monitor for downlink HARQ-ACK feedback associated with the device-to-device subframes, and
the first UE does not monitor for uplink scheduling grant signals associated with the device-to-device subframes.

9. The method of claim 1, further comprising determining the number of downlink HARQ processes to be used based on
a number of downlink HARQ processes in the first uplink-downlink configuration, minus
the number of the device-to-device subframes, plus a number of available uplink subframes of a serving cell in a set of downlink subframes within a radio frame according to the second uplink-downlink configuration.

10. The method of claim 1, further comprising determining the number of uplink HARQ processes based on the number of uplink HARQ processes in the first uplink-downlink configuration, minus the number of the device-to-device subframes within a radio frame.

11. A method in a first UE, the method comprising:
receiving, from a network entity via broadcast signaling, a first uplink-downlink configuration of a series of subframes, the first uplink-downlink configuration designating a set of one or more subframes of the series of subframes as uplink subframes;
receiving, from the network entity via dedicated signaling, an indication of which subframe or subframes of the series are to be used as device-to-device subframes;
determining, based on the first uplink-downlink configuration and on positions, in the series, of the one or more device-to-device subframes, a second uplink-downlink configuration of the series of subframes, the second uplink-downlink configuration being different than the first uplink-downlink configuration;
determining, based on the first and second uplink-downlink configurations, which subframe or subframes of the series are to be used as HARQ-ACK subframes;
transmitting directly to the second UE and receiving directly from the second UE on one or more of the device-to-device subframes;
transmitting one or more uplink HARQ-ACK messages to the network entity on one or more of the HARQ-ACK subframes of the series; and
adjusting a number of HARQ processes based at least on a number of the subframes determined to be device-to-device subframes and the first uplink-downlink configuration.

12. The method of claim 11, further comprising:
receiving data from the network entity on a first downlink subframe,
wherein, according to the first uplink-downlink configuration, the downlink subframe is associated with a device-to-device subframe of the one or more device-to-device subframes, and
wherein, according to the second uplink-downlink configuration, the downlink subframe is associated with a HARQ-ACK subframe of the one or more HARQ-ACK subframes.

13. The method of claim 11,
the method further comprising receiving data from the network entity on a downlink subframe,
wherein, according to the first uplink-downlink configuration, no device-to-device subframe of the one or more device-to-device subframes is associated with the downlink subframe,
wherein transmitting one or more uplink HARQ-ACK messages comprises:
transmitting an uplink HARQ-ACK message on a first HARQ-ACK subframe, wherein, according to the first uplink-downlink configuration, the first HARQ-ACK subframe is associated with the downlink subframe; or
transmitting an uplink HARQ-ACK message on a second HARQ-ACK subframe, wherein, according to the second uplink-downlink configuration, the second HARQ-ACK subframe is associated with the downlink subframe.

14. The method of claim 11,
wherein the one or more device-to-device subframes are not available for uplink HARQ-ACK feedback,
wherein the second uplink-downlink configuration meets a set of criteria including
the second uplink-downlink configuration designates a set of one or more subframes of the series of subframes as uplink subframes, wherein the set of uplink subframes does not include the one or more device-to-device subframes, and
the HARQ-ACK subframes based on the second uplink-downlink configuration are a subset of uplink subframes available in the first uplink-downlink configuration after subtracting the one or more device-to-device subframes.

15. The method of claim 14,
wherein if there is more than one uplink-downlink configuration that satisfy the set of criteria, the second uplink-downlink configuration is selected from a group consisting of:
the configuration with the largest number of HARQ-ACK subframes available for transmitting HARQ-ACK messages of downlink subframes of the first uplink-downlink configuration,
the configuration with the minimum HARQ-ACK delay, and
the configuration with the minimum HARQ-ACK delay and with the smaller number of downlink subframes associated with a single HARQ-ACK subframe.

16. The method of claim 11, further comprising:
determining an uplink control channel resource dimension based on the second uplink-downlink configuration; and
transmitting the one or more uplink HARQ-ACK messages on an uplink control channel resource having the determined dimension.

17. The method of claim 16, further comprising increasing the uplink control channel resource dimension by at least one if the first and the second uplink-downlink configurations have the same number of elements in downlink association sets of a given uplink subframe.

18. The method of claim 16, wherein the network entity configures the uplink control channel resource for the first UE by using either a higher-layer signaling or a downlink control channel, or both if the first and the second uplink-downlink configurations have the same number of elements in downlink association sets of a given uplink subframe.

19. The method of claim 11, further comprising
selecting subframes for monitoring for downlink HARQ-ACK feedback and subframes for monitoring for uplink scheduling grant signals, such that
the first UE does not monitor for downlink HARQ-ACK feedback associated with the device-to-device subframes, and
the first UE does not monitor for uplink scheduling grant signals associated with the device-to-device subframes.

20. The method of claim 11, further comprising determining the number of downlink HARQ processes to be used based on a number of downlink HARQ processes in
the first uplink-downlink configuration, minus
the number of the device-to-device subframes, plus a number of available uplink subframes of a serving cell in a set of downlink subframes within a radio frame according to the second uplink-downlink configuration.

21. The method of claim 11, further comprising determining the number of uplink HARQ processes based on the number of uplink HARQ processes in
the first uplink-downlink configuration, minus
the number of the device-to-device subframes within a radio frame.

22. An apparatus comprising:
a transceiver configured to:
receive, from a network entity via broadcast signaling, a first uplink-downlink configuration, the first uplink-downlink configuration designating a first set of subframes of a series of subframes as uplink subframes;
receive, from the network entity via dedicated signaling, a second uplink-downlink configuration, the second uplink-downlink configuration designating a second set of subframes of the series of subframes as uplink subframes, the second set including one or more uplink subframes;
wherein the first set of uplink subframes and the second set of uplink subframes differ from one another by at least one uplink subframe;
a controller configured to:
compare the first set of uplink subframes with the second set of uplink subframes;
determine, based on the comparison of the first set of uplink subframes and the second set of uplink subframes, which subframe or subframes of the series are device-to-device subframes and which subframe or subframes of the series are HARQ-ACK subframes;
wherein the transceiver is further configured to:
transmit directly to a second UE and receive directly from the second UE on one or more of the device-to-device subframes;
transmit one or more uplink HARQ-ACK messages to the network entity on one or more of the HARQ-ACK subframes; and
adjust a number of uplink HARQ processes based at least on a number of the subframes determined to be device-to-device subframes and the first uplink-downlink configuration.

23. An apparatus comprising:
a transceiver configured to:
receive, from a network entity via broadcast signaling, a first uplink-downlink configuration of a series of subframes, the first uplink-downlink configuration designating a set of subframes of the series of subframes as uplink subframes;
receive, from the network entity via dedicated signaling, an indication of which subframe or subframes of the series are to be used as device-to-device subframes;
a controller configured to:
determine, based on the first uplink-downlink configuration and on positions of the one or more device-to-device subframes, a second uplink-downlink configuration of the series of subframes, the second uplink-downlink configuration being different than the first uplink-downlink configuration;
determine, based on the first and second uplink-downlink configurations, which subframe or subframes of the series are to be used as HARQ-ACK subframes;
wherein the transceiver is further configured to:
transmit directly to the second UE and receive directly from the second UE on one or more of the device-to-device subframes;
transmit one or more uplink HARQ-ACK messages to the network entity on messages on one or more of the HARQ-ACK subframes; and
adjust a number of HARQ processes based at least on a number of the subframes determined to be device-to-device subframes and the first uplink-downlink configuration.

* * * * *